US006864347B2

(12) United States Patent
van Heyningen et al.

(10) Patent No.: US 6,864,347 B2
(45) Date of Patent: Mar. 8, 2005

(54) NONLINEAR OPTICAL CHIRAL COMPOUNDS AND DEVICES INCORPORATING SAME

(75) Inventors: Martin Kits van Heyningen, Newport, RI (US); Thierry Verbiest, Veltem (BE); Andre Persoons, Holsbeek (BE); Celeste Samyn, Herent (BE); Guy Koeckelberghs, Heist-Op-Den-Berg (BE)

(73) Assignee: KVH Industries, Inc., Middletown, RI (US)

(*) Notice: Subject to any disclaimer, the term of this patent is extended or adjusted under 35 U.S.C. 154(b) by 20 days.

(21) Appl. No.: 10/186,213

(22) Filed: Jun. 28, 2002

(65) Prior Publication Data

US 2003/0161605 A1 Aug. 28, 2003

Related U.S. Application Data

(60) Provisional application No. 60/347,127, filed on Jan. 9, 2002, and provisional application No. 60/301,730, filed on Jun. 28, 2001.

(51) Int. Cl.[7] .............................................. C08G 64/00
(52) U.S. Cl. ....................... 528/201; 528/205; 528/211; 528/219; 528/422
(58) Field of Search ................................ 528/201, 205, 528/211, 219, 422; 385/122

(56) References Cited

U.S. PATENT DOCUMENTS 5,288,426 A 2/1994 Itoh et al.
5,290,630 A 3/1994 Devonald et al.

(List continued on next page.)

FOREIGN PATENT DOCUMENTS

| WO | WO97/08262 | 3/1997 |
| WO | WO00/54103 | 9/2000 |
| WO | WO01/14931 A1 | 3/2001 |
| WO | WO01/53746 A1 | 7/2001 |
| WO | WO01/77749 A1 | 10/2001 |
| WO | WO01/79750 A1 | 10/2001 |
| WO | WO02/08215 A1 | 1/2002 |

OTHER PUBLICATIONS

Albota et al; "Design of Organic Molecules with Large Two–Photon Absorption Cross Sections" *Science*, 281:1653–1656 (1998).

Altomare et al., "Chiral Methacrylic Polymers Containing Permanent Dipole Azobenzene Chromophores. $^{13}$C NMR Spectra and Photochromic Properties" *Macromolecular Chemistry and Physics*, 198(6): 1739–1751 (1997).

Blinov et al., "Photochromism and Holographic Grating Recording on a Chiral Side–Chain Liquid Crystalline Copolymer Containing Azobenzene Chromophores" *Chemical Physics*, 245: 473–485 (1999).

Chen et al., "The Synthesis of Nitroaniline Monomers and Polymers as Non–Linear Optical Ferroelectric Liquid Crystals" *Liquid Crystals*, 20(2): 125–138 (1996).

Dalton et al., "The Role of London Forces in Defining Noncentrosymmetric Order of High Dipole Moment—High Hyperpolarizability Chromophores in Electrically Poled Polymeric Thin Films" *Proc. Natl. Acad. Sci. USA*, 94: 4842–4847 (May 1997).

(List continued on next page.)

*Primary Examiner*—Duc Truong
(74) *Attorney, Agent, or Firm*—Foley Hoag, LLP; Theresa C. Kavanaugh

(57) ABSTRACT

The present disclosure is in part directed to optical devices for modulating light comprising compounds which spontaneously align. The disclosure is also directed to electro-optic compounds wherein chromophore substituents are chemically bound to a chiral polymer. In one embodiment, the chiral polymer comprises a binaphthyl monomeric unit.

36 Claims, 13 Drawing Sheets

U.S. PATENT DOCUMENTS

| | | | |
|---|---|---|---|
| 5,347,394 | A | 9/1994 | Wakita et al. |
| 5,514,799 | A | 5/1996 | Varanasi et al. |
| 5,549,853 | A | 8/1996 | Beckmann et al. |
| 5,718,845 | A | 2/1998 | Drost et al. |
| 5,777,063 | A | 7/1998 | Gordon et al. |
| 5,783,306 | A | 7/1998 | Therien et al. |
| 5,856,431 | A | 1/1999 | Gibbons et al. |
| 5,883,218 | A | 3/1999 | Gordon et al. |
| 5,993,700 | A | 11/1999 | Katz et al. |
| 6,017,470 | A | 1/2000 | Katz et al. |
| 6,067,186 | A | 5/2000 | Dalton et al. |
| 6,086,794 | A | 7/2000 | Nobutoki et al. |
| 6,090,985 | A | 7/2000 | MacDiarmid et al. |
| 6,139,771 | A | 10/2000 | Walba et al. |
| 6,156,232 | A | 12/2000 | Shashidhar et al. |
| 6,200,655 | B1 | 3/2001 | Gibbons et al. |
| 6,229,047 | B1 | 5/2001 | Glaser et al. |
| 6,288,206 | B1 | 9/2001 | Stewart et al. |
| 6,348,992 | B1 | 2/2002 | Zhang et al. |
| 6,361,717 | B1 | 3/2002 | Dalton et al. |
| 2002/0027220 | A1 | 3/2002 | Wang et al. |

OTHER PUBLICATIONS de la Torre et al., "Phthalocyanines and Related Compounds: Organic Targets of Nonlinear Optical Applications" *J. Mater. Chem.*, 8(8): 1671–1683 (1998).

Deussen et al., "Novel Chiral Bis–Dipolar 6,6–Disubstituted Binaphthol Derivatives for Second–Order Nonlinear Optics: Synthesis and Linear and Nonlinear Optical Properties" *J. Am. Chem. Soc.*, 118: 6841–6852 (1996).

Elshocht et al., "Chiral 1, 1'–Binaphthyl–Based Helical Polymers as Nonlinear Optical Materials" *Chemical Physics Letters*, 309: 315–320 (1999).

Fujiki et al; "Computing Handedness: Quantized and Superposed Switch and Dynamic Memory of Helical Polysilylene" *J. Am. Chem. Soc.*, 123: 6253–6261 (2001).

Hult et al; "A Pyroelectric Liquid Crystal Polymer (PLCP) for Second–Harmonic Generation" *Liquid Crystals*, 20 (1): 23–28 (1996).

Kauranen et al., "Supramolecular Second–Order Nonlinearity of Polymers with Orientationally Correlated Chromophores," *Science*, 270(1): 966–968 (Nov. 1995).

Ma et al., "Highly Efficient and Thermally Stable Nonlinear Optical Dendrimer for Electrooptics," *J. Am. Chem. Soc.*, 123: 986–987 (2001).

Müller and Zentel, "Azo–Dyes as Labels and as Photoisomerizable Units in Chiral Polyisocyanates," *Macromolecular Chemistry and Physics* 194 (1): 101–116 (1993).

Ostroverkhov et al., "Second–Harmonic Generation in Nonpolar Chiral Materials: Relationship Between Molecular and Macroscopic Properties," *J. Opt. Soc. Am.*, 18(12): 1858–1865 (Dec. 2001).

Ostroverkov et al., "Prospects for Chiral Nonlinear Optical Media," *IEEE* 7(5): 781–792 (Sep./Oct. 2001).

Verbiest et al., "Exceptionally Thermally Stable Polyimides for Second–Order Nonlinear Optical Applications," *Science*, 268: 1604–1606 (Jun. 1995).

Zhang et al., "Electric Poling and Relaxation of Thermoset Polyurethane Second–Order Nonlinear Optical Materials: Role of Cross–Linking and Monomer Rigidity," *Macromolecules*, 235–243 (2001).

International Search Report dated Oct. 28, 2002.

chr=

41

51

NONLINEAR OPTICAL CHIRAL COMPOUNDS AND DEVICES INCORPORATING SAME

RELATED APPLICATION INFORMATION

This application claims the benefit of priority to U.S. Provisional Application Ser. No. 60/301730, filed Jun. 28, 2001; and to U.S. Provisional Application Ser. No. 60/347127, filed Jan. 9, 2002.

INTRODUCTION

Advances in polymeric electro-optic materials and device fabrication techniques have increased the potential of these materials and devices incorporating them, respectively, such as electro-optic modulators, waveguides and fiber optic cores. Polymeric electro-optic materials have potential advantages over traditional inorganic materials, which may include larger band widths, better integration with optical circuits, ease of fabrication, and lower operating voltages.

For fabrication of electro-optical devices, a polymeric material should have high thermal, chemical, and mechanical stability. Potential applications of electro-optic compounds and composites may require that the material possesses non-linear optical properties, including nonlinear polarization. Molecular or microscopic optical non linear polarization can be expressed as a power series of the electric field:

$$p_1 = \alpha E_j + \beta E_j E_k + \gamma E_j E_k E_l + \ldots$$

where $\alpha$ is the linear polarizability, $\beta$ is the first hyperpolarizability, and $\gamma$ is the second hyperpolarizability. Polarizability is directly related to the index of refraction. Molecules of acentric dipolar symmetry are usually required for second-order nonlinear optical behavior. Typical chromophores which display a non-zero $\beta$ are charge-transfer molecules which have the general formula: (electron donor) ($\pi$-electron bridge)(electron acceptor).

To maintain a stable dipole alignment for electro-optical devices, high glass transition temperature ($T_g$) polymers with nonlinear optical chromophores incorporated as side chains or cross-linkable polymers with nonlinear optical chromophores which are embedded in or covalently bound to a polymer have been used. The host polymers in these systems may not contribute to optical microscopic or macroscopic nonlinearity: the optical non-linearity stems from the $\pi$-electron structure of the chromophore.

For macroscopic electro-optic activity to be finite, a chromophore/polymer system must exhibit net acentric, or non-centrosymmetric, order. The second-harmonic signals indicative of nonlinear optical response arise from the quadratic response of the sample to an electric field, such as a laser beam. This response is represented by the nonlinear (macroscopic) polarization $$P_i(2\omega) = \sum_{j,k} \chi_{ijk} E_j(\omega) E_k(\omega)$$

where ijk refer to the Cartesian coordinates, $E_j(\omega)$ and $E_k(\omega)$ are the components of the optical field at the fundamental frequency, $\chi_{ijk}$ is a component of the second-order nonlinear susceptibility tensor $\chi^{(2)}$, and $P_i(2\omega)$ is a component of the nonlinear source polarization at the second-harmonic frequency. For sufficiently thin samples of electro-optic material, the polarization may lead to a amplitude of the second-harmonic field $E(2\omega)$ which may vary linearly with thickness. For device use, a chromophore/polymer system should have significant nonlinear optical (NLO) or electro-optical (EO) coefficients.

Macroscopic acentric order is most commonly introduced by an electric field that orients the molecules in a single direction. Methods to achieve macroscopic noncentrosymmetry, in for example, chromophore/polymer systems include electric field poling, crystal growth, self-assembly, and deposition of Langmuir-Blodgett (LB) films. Such molecularly oriented polymers, however, may exhibit defects due to gradual weakening of the orientation and a smaller nonlinear effect due to the heat motion of the molecular chains.

Electric field poling usually involves applying an external electric field to break the isotropic symmetry of the polymers, during which the NLO dye chromophores are aligned by coupling to their dipole moment. This poling procedure may impose noncentrosymmetry on the polymer material. The desired noncentrosymmetry may be most easily induced at temperatures close to the glass transition temperature, $T_g$, of the polymer because of the increased mobility of the NLO dye molecules in the softening polymer matrix. Cooling may then be performed in the presence of the applied electric field, which results in the formation of a polymer glass at the lower temperatures. For poled systems, optical loss maybe present due in part to surface damage of polymer films and chromophore migration.

For optical device use, a polymer containing, for example, quasi one-dimensional nonlinear optical chromophores, may be spincoated onto a solid substrate to yield thin films. Subsequently, the polymer film is poled, resulting in polar ordering of the one-dimensional molecules along the film normal, yielding films which, for example, may have a $C_{\infty v}$-symmetry. Such poled samples may be thermodynamically unstable, and eventually they may return to their original isotropic centrosymmetric state. Further, these poled achiral polymers may not have polarization corresponding to the $\chi_{xyz}$ component of the microscopic susceptibility.

Accordingly, there is a need for electroptical polymeric materials which have enhanced optical properties. Further, materials that may exhibit these macroscopic properties without significant post processing, such as poling, would have substantial advantages in devices such as waveguides and modulators.

SUMMARY

The present invention is in part directed to chiral, or optically active, polymers which are useful for optical devices, electro-optic compounds and compositions. In one embodiment, an optical device is provided which comprises an optically active compound comprising a chromophore and a polymer, where either the chromophore or the polymer is chiral, or both are chiral, and where the chromophore undergoes spontaneous alignment.

In one embodiment, the optically active compound may have $D_n$ symmetry, wherein n is equal to, or greater than, 2. In another embodiment, the optically active compound may be helical.

In another embodiment, the optically active compound comprises a polymer comprising one or more monomeric units comprising a binaphthyl moiety and a chromophore chemically bonded to a least one of said monomeric units, where the optically active compound has a non-centrosymmetric symmetry. The binaphthyl moiety may be selected from the group consisting of a binaphthyl structure, a binaphthol structure, a 1,1'-binaphthyl-2-ol-2'-amine structure, and a 1,1'-binaphthyl-2,2'-diamine structure. The monomeric units may further comprise an alkyl moiety linked to the binaphthyl moiety. In one embodiment, the alkyl moiety comprises an alkynyl group.

In another embodiment, the optically active compound may be represented a chromophore chemically bonded to a polymer, where a monomeric unit of the polymer may be represented by formula I or II:

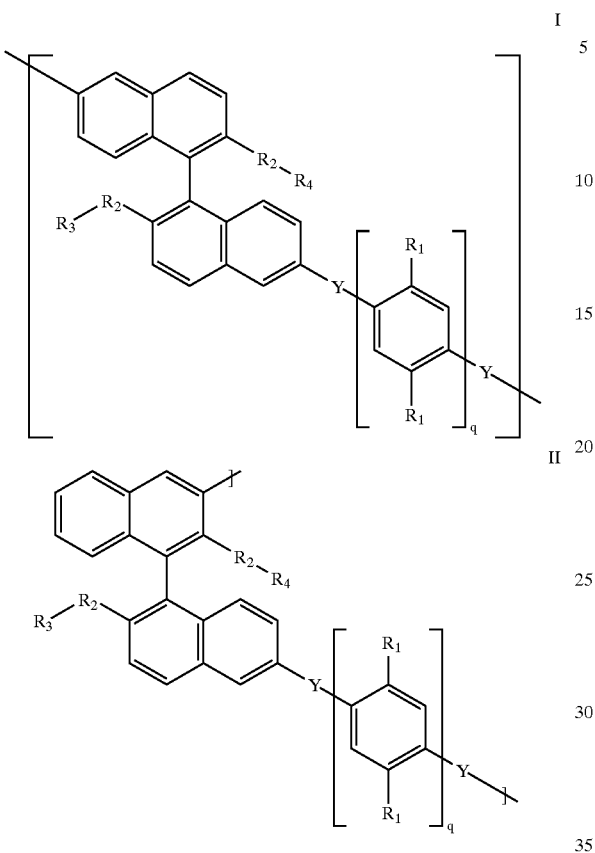

wherein

Y represents independently for each occurrence a bond, alkyl, alkenyl, or alkynyl;

$R_1$ represents independently for each occurrence H, alkyl, or alkoxy;

$R_2$ represents independently for each occurrence $N(R_1)$, O, S, Se or alkylene;

$R_3$ represents independently for each occurrence H, alkyl, or a chromophore;

$R_4$ represents independently for each occurrence H, alkyl or a chromophore; and q is in the range 1 to 7 inclusive.

In one embodiment, one or more chromophores are covalently bonded to a monomeric subunit of the compound. In another embodiment, one or more chromophores are covalently bonded to one or more monomeric subunits of the compound. In yet another embodiment, one or more chromophores are covalently bonded to substantially all monomeric units of the compound.

In another embodiment, the percentage of monomeric units functionalized by one or more chromophores is greater than about 3%, greater than about 7%, or even greater than about 10%. The monomeric units of the chiral polymers may be functionalized with one or more chromophores which may be covalently bonded to alternating or random monomeric units.

Each monomeric unit of the nonlinear optical compound may be functionalized by one or more of the same chromophore, or each monomeric unit of the compound may be functionalized by differing chromophores. One monomeric unit may be functionalized by two differing chromophores.

In another embodiment, a nonlinear optical polymer is represented by structures with formula I or II:

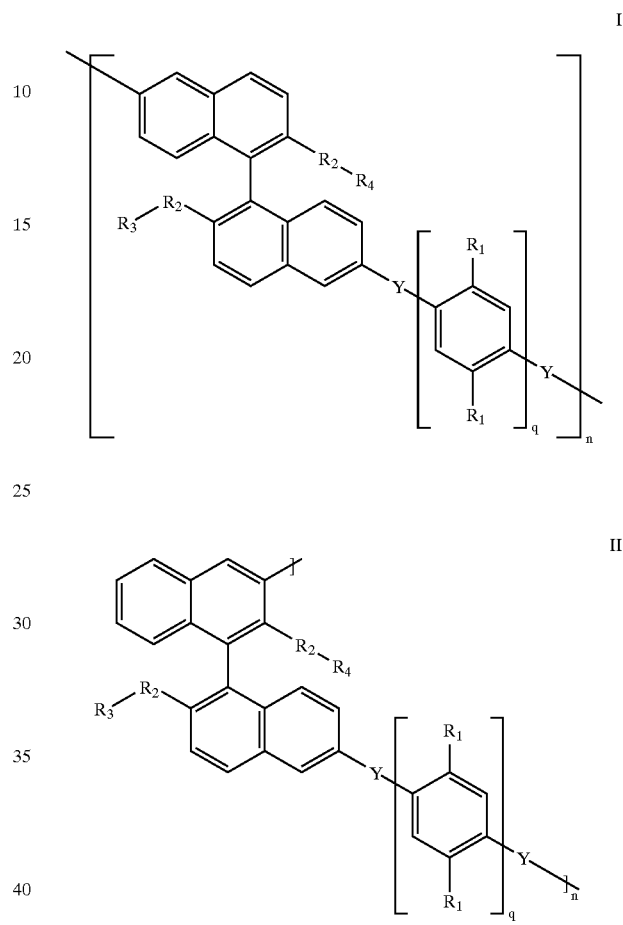

wherein

Y represents independently for each occurrence a bond, alkyl, alkenyl, or alkynyl;

$R_1$ represents independently for each occurrence H, alkyl, or alkoxy;

$R_2$ represents independently for each occurrence $N(R_1)$, O, S, Se or alkylene;

$R_3$ represents independently for each occurrence H, alkyl, or a chromophore;

$R_4$ represents independently for each occurrence H, alkyl or a chromophore;

q is in the range 1 to 7 inclusive; and n is an integer from 1 to about 100

In one embodiment, n is 1 to about 100. In another embodiment, n is 1 to about 50; in another embodiment, n is about 5 to about 50; and in a further embodiment, n is about 10 to about 50.

In one embodiment, the polymer is represented by the structure:

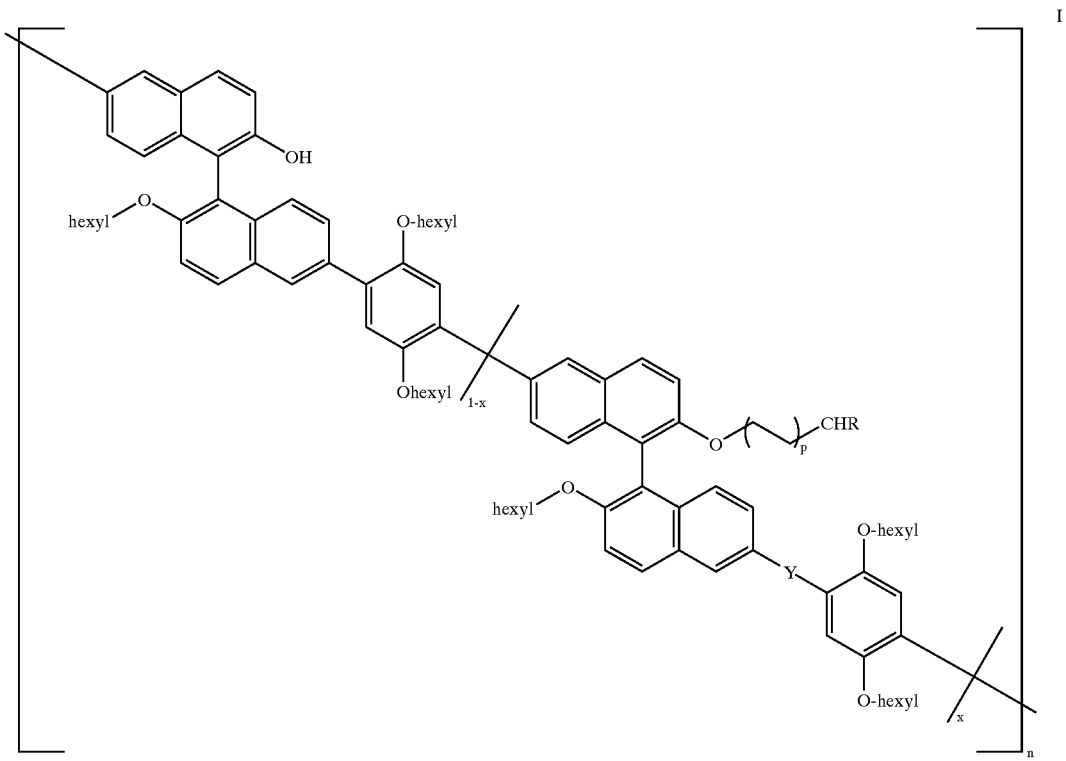

wherein
CHR represents independently for each occurrence a chromophore;
p is the range 0 and 7 inclusive;
x is 1 to about 50; and
n is about 10 to about 50.

In one embodiment, the polymer may exhibit an electro-optic coefficient of greater than about 10 pm/V.

DETAILED DESCRIPTION

A. Overview

Figure 1A:
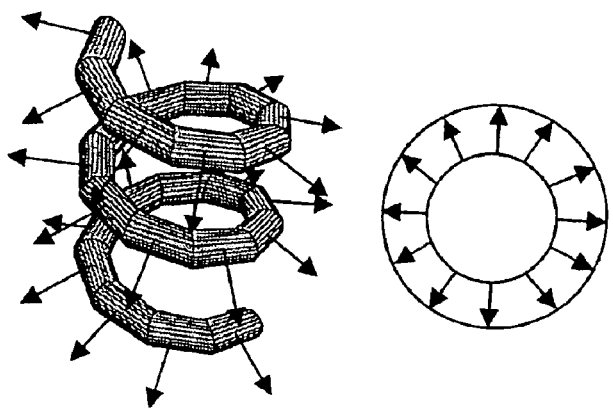
FIG. 1a depicts schematically a helical polymer with nonlinear optical chromophores attached as side groups.

The present disclosure is in part directed to chiral, or optically active, polymers which are useful for electro-optic compounds and compositions. In one embodiment, chromophore substituents may be covalently bound to an optically active polymer. In one embodiment, a chromophore is covalently bonded to a chiral polymer. In another embodiment, a chiral chromophore is bonded to an achiral or a chiral polymer, wherein the chiral chromophore induces chirality in the resulting electro-optic compound. In yet another embodiment, the nonlinear optical compound has a helical configuration.

In an aspect of the present disclosure, a device for modulating light comprises a compound or composition of the present disclosure.

B. Definitions

For convenience, before further description, certain terms employed in the specification, examples, and appended claims are collected here. These definitions should be read in light of the reminder of the disclosure and understood as by a person of skill in the art.

The articles "a" and "an" are used herein to refer to one or to more than one (i.e. to at least one) of the grammatical object of the article. By way of example, "an element" means one element or more than one element.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$–$C_{30}$ for straight chain, $C_3$–$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

The term "aralkyl" is art-recognized, and includes alkyl groups substituted with an aryl group (e.g., an aromatic or heteroaromatic group).

The terms "alkenyl" and "alkynyl" are art-recognized, and include unsaturated aliphatic groups analogous in length and possible substitution to the alkyls described above, but that contain at least one double or triple bond respectively.

Unless the number of carbons is otherwise specified, "lower alkyl" refers to an alkyl group, as defined above, but having from one to ten carbons, alternatively from one to about six carbon atoms in its backbone structure. Likewise, "lower alkenyl" and "lower alkynyl" have similar chain lengths.

The term "chiral" refers to asymmetric molecules, polymers, residues, or moieties thereof, the mirror images of which are nonsuperimposable and which are related like right and left hands. Each mirror image is referred to herein as an "enantiomer". Chiral materials are characterized as exhibiting "optical activity", which refers to the ability to change the direction of the plane of polarized light to either the right or left as it passes through the material. The term "chiral polymer" refers to an optically active polymer.

The terms "heterocyclyl" and "heterocyclic group" are art-recognized, and include 3- to about 10-membered ring structures, such as 3- to about 7-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The terms "polycyclyl" and "polycyclic group" are art-recognized, and include structures with two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms, e.g., three or more atoms are common to both rings, are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "carbocycle" is art recognized and includes an aromatic or non-aromatic ring in which each atom of the ring is carbon. The flowing art-recognized terms have the following meanings: "nitro" means —$NO_2$; the term "halogen" designates —F, —Cl, —Br or —I; the term "sulfhydrly" means —SH; the term "hydroxyl" means —OH; and the term "sulfonyl" means —$SO_2^-$.

The terms "amine" and "amino" are art-recognized and include both unsubstituted and substituted amines, e.g., a moiety that may be represented by the general formulas:

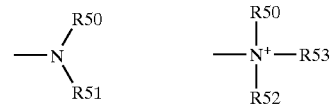

wherein R50, R51 and R52 each independently represent a hydrogen, an alkyl, an alkenyl, —$(CH_2)_m$—R61, or R50 and R51, taken together with the N atom to which they are attached complete a heterocycle having from 4 to 8 atoms in the ring structure; R61 represents an aryl, a cycloalkyl, a cycloalkenyl, a heterocycle or a polycycle; and m is zero or an integer in the range of 1 to 8. In certain embodiments, only one of R50 or R51 may be a carbonyl, e.g., R50, R51 and the nitrogen together do not form an imide. In other embodiments, R50 and R51 (and optionally R52) each independently represent a hydrogen, an alkyl, an alkenyl, or —$(CH_2)_m$—R61. Thus, the term "alkylamine" includes an amine group, as defined above, having a substituted or unsubstituted alkyl attached thereto, i.e., at least one of R50 and R51 is an alkyl group.

The term "acylamino" is art-recognized and includes a moiety that may be represented by the general formula:

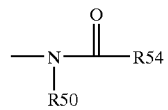

wherein R50 is as defined above, and R54 represents a hydrogen, an alkyl, an alkenyl or —$(CH_2)_m$—R61, where m and R61 are as defined above.

The term "amido" is art-recognized as an amino-substituted carbonyl and includes a moiety that may be represented by the general formula:

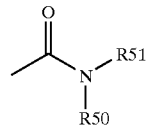

wherein R50 and R51 are as defined above. Certain embodiments of the amide in the present invention will not include imides which may be unstable.

The term "carbonyl" is art-recognized and includes such moieties as may be represented by the general formulas:

wherein X50 is a bond or represents an oxygen or a sulfur, and R55 represents a hydrogen, an alkyl, an alkenyl, —$(CH_2)_m$—R61 or a salt, R56 represents a hydrogen, an alkyl, an alkenyl or —$(CH_2)_m$—R61, where m and R61 are defined above. Where X50 is an oxygen and R55 or R56 is not hydrogen, the formula represents an "ester". Where X50 is an oxygen, and R55 is as defined above, the moiety is referred to herein as a carboxyl group, and particularly when R55 is a hydrogen, the formula represents a "carboxylic acid". Where X50 is an oxygen, and R56 is hydrogen, the formula represents a "formate". In general, where the oxygen atom of the above formula is replaced by sulfur, the formula represents a "thiocarbonyl" group. Where X50 is a sulfur and R55 or R56 is not hydrogen, the formula represents a "thioester." Where X50 is a sulfur and R55 is hydrogen, the formula represents a "thiocarboxylic acid." Where X50 is a sulfur and R56 is hydrogen, the formula represents a "thioformate." On the other hand, where X50 is a bond, and R55 is not hydrogen, the above formula represents a "ketone" group. Where X50 is a bond, and R55 is hydrogen, the above formula represents an "aldehyde" group.

The terms "alkoxyl" or "alkoxy" are art-recognized and include an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, —O—$(CH_2)_m$—R61, where m and R61 are described above.

Substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls.

The definition of each expression, e.g. alkyl, m, n, etc., when it occurs more than once in any structure, is intended to be independent of its definition elsewhere in the same structure unless otherwise indicated expressly or by the context.

A list of the abbreviations utilized by organic chemists of ordinary skill in the art appears in the first issue of each volume of the *Journal of Organic Chemistry*; this list is typically presented in a table entitled *Standard List of Abbreviations*.

Certain monomeric subunits of the present disclosure may exist in particular geometric or stereoisomeric forms. In addition, polymers and other compositions of the present disclosure may also be optically active. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

If, for instance, a particular enantiomer of a compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

The terms ortho, meta and para are art-recognized and apply to 1,2-, 1,3- and 1,4-disubstituted benzenes, respectively. For example, the names 1,2-dimethylbenzene and ortho-dimethylbenzene are synonymous.

The term 'modulate' is art-recognized, and refers to the process, or result of the process, of varying a characteristic of a carrier, for example, light, which may be in accordance with an information bearing signal.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

For purposes of this invention, the chemical elements are identified in accordance with the Periodic Table of the Elements, CAS version, Handbook of Chemistry and Physics, 67th Ed., 1986–87, inside cover.

"Poling" is a term well-known in the art which refers to the process of aligning the individual dipole moments of a nonlinear optical component of a polymer by placing a large external electric field across the material at an elevated temperature. The interaction with the electric field causes a dipolar species to align in the direction of the applied field. If the polymer is then cooled to its glassy state with the field applied, the field induced non-centrosymmetric alignment is frozen into place, and the material exhibits second-order nonlinear optical properties. The poling process induces a polar axis in a polymer film.

The nonlinear hyperpolarisability β and nonlinear susceptibility $\chi^{(2)}$ are art-recognized tensors which are a function of the nonlinear optical properties of a compound or medium. The nonlinear susceptibility tensors may have certain forms of symmetry that reflect the structural symmetry of the medium. Accordingly, some tensor elements are zero and others are related to each other, greatly reducing the total number of independent elements. For the tensor $\chi^{(2)}$, there are 27 elements. For example, as known to someone skilled in the art, a compound or medium with the symmetry group $D_\infty$, corresponding to uniaxial alignment, has tensor elements of χ which have non-vanishing components include $\chi^{(2)}_{xyz}$, $\chi^{(2)}_{xzy}$, $\chi^{(2)}_{yxz}$, and $\chi^{(2)}_{yzx}$. A compound or medium with symmetry group $D_n$ (n>2 or n=2) has non vanishing components of χ corresponding to $\chi^{(2)}_{ijk}$ (with i not equal to j not equal to k). The symmetry group $D_2$, for example, corresponds to biaxial alignment.

C. Nonlinear Optically Active Compounds

In one embodiment, compounds which display non-centrosymmetric symmetry may comprise chiral polymers which are functionalized with a chromophore. In another embodiment, compounds which display non-centrosymmetric symmetry may comprise achiral polymers which are functionalized with a chiral chromophore. In an embodiment, the nonlinear optical compounds may have a helical configuration or have $D_n$ symmetry.

In an embodiment, the nonlinear optical compounds undergo spontaneous alignment, for example, upon functionalization of a polymer with a chromophore. Spontaneously aligned compounds may exhibit macroscopic nonlinear polarization, without, for example, an alignment procedure, for example, poling.

In one embodiment, the nonlinear optical compounds may be a chiral bi-naphthyl based polymer functionalized with one or more chromophores. A chiral bi-naphthyl polymer may include any chiral polymer with a bi-naphthyl moiety, for example, a bi-naphthyl based monomeric unit, a binaphthol based monomeric unit, or a 1,1'-binaphthyl-2-ol-2'-amine based monomeric unit. In an embodiment, the chiral polymer functionalized with one or more chromophores may have monomeric units comprising binaphthyl groups, binaphthol groups, or 1,1'-binaphthyl-2-ol-2'-amine groups, or a combination of these groups within the same monomeric unit or in differing monomeric units. In one embodiment, a monomeric unit of a chiral polymer functionalized with one or more chromophores comprises a bi-naphthyl group linked to an alkyl, alkylene or alkynyl group or di-alkyl-phenyl group, wherein differing monomeric units of a polymer may comprise differing or the same groups. A chiral bi-naphthyl based polymer functionalized with one or more chromophores may have one or more chromophores functionalized to at least one monomeric unit. A chiral bi-naphthyl based polymer functionalized with one or more chromophores may have one or more chromophores functionalized to each monomeric unit.

In one embodiment, the chiral chromophore functionalized nonlinear optical compound, or the optically active compound may be formulas I or II:

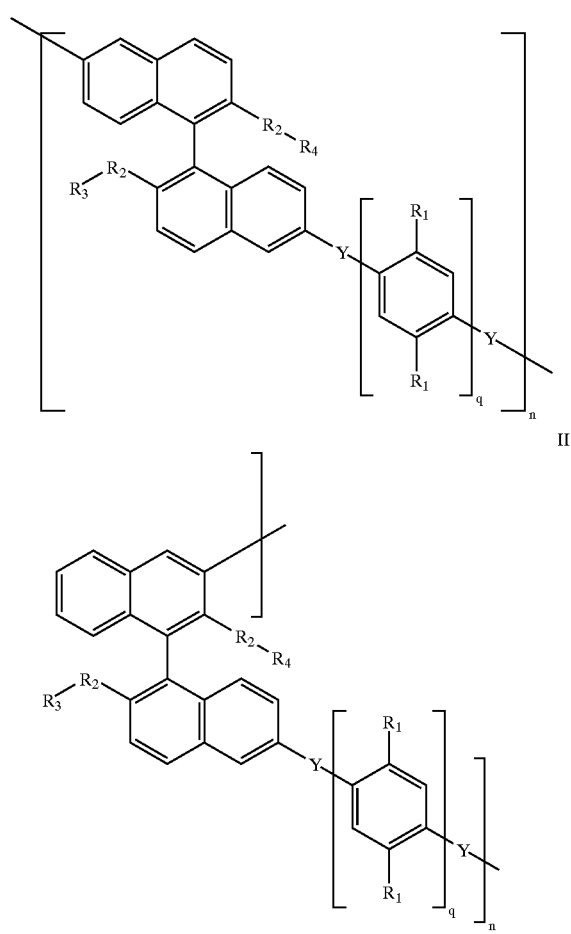

wherein
Y is represents independently for each occurrence a bond, alkyl, alkenyl, or alkynyl;
$R_1$ represents independently for each occurrence H, alkyl, or alkoxy;

$R_2$ represents independently for each occurrence $N(R_1)$, O, S, Se or alkylene;
$R_3$ represents independently for each occurrence H, alkyl, or a chromophore;
$R_4$ represents independently for each occurrence H, alkyl, or a chromophore;
at least one instance of $R_3$ or $R_4$ is a chromophore;
q is in the range 1 to 7 inclusive; and
n is 1 to about 1000.

In one embodiment, $R_1$ is hexyl. In another embodiment, $R_3$ is hexyl. In one embodiment, n is 1 to about 100. In yet another embodiment, $R_3$ and $R_4$ each independently may be an alkyl-chromophore moiety, for example, an alkyl chain of 1 to about 10 carbons in length.

In another embodiment, q is the range 1 to 3 inclusive. In yet another embodiment, q is 1.

In another embodiment, n is 1 to about 50, and another embodiment, n is about 5 to about 50, and in a further embodiment, n is about 10 to about 50.

In yet another embodiment, a chromophore is covalently attached to a chiral polymer through an alkoxy group or an amino group on the polymer. In an embodiment, more than one chromophore is attached to a monomeric subunit of the chiral polymer. In another embodiment, substantially all monomeric units of the polymer are functionalized by one or more chromophores. In other embodiments, the percentage of monomeric units functionalized by one or more chromophores is greater than about 3%, greater than about 7%, or greater than about 10%. In another embodiment, the percentage of chromophores covalently bonded to a polymer is greater than about 3%, greater that about 7%, or even greater than about 10% by weight of chromophore per total weight of polymer.

Each monomeric units of the nonlinear optical compound may be functionalized by one or more of the same chromophore, or each monomeric unit of the compound may be functionalized by distinct chromophores. One monomeric unit may be functionalized by two distinct chromophores.

Figure 1B:
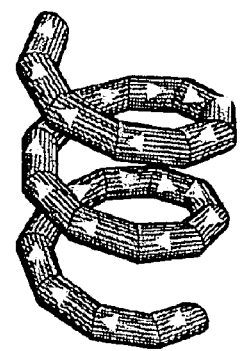
FIG. 1b depicts a helical polymer with nonlinear optical chromophores directly incorporated into the helical backbone.
Figure 2:
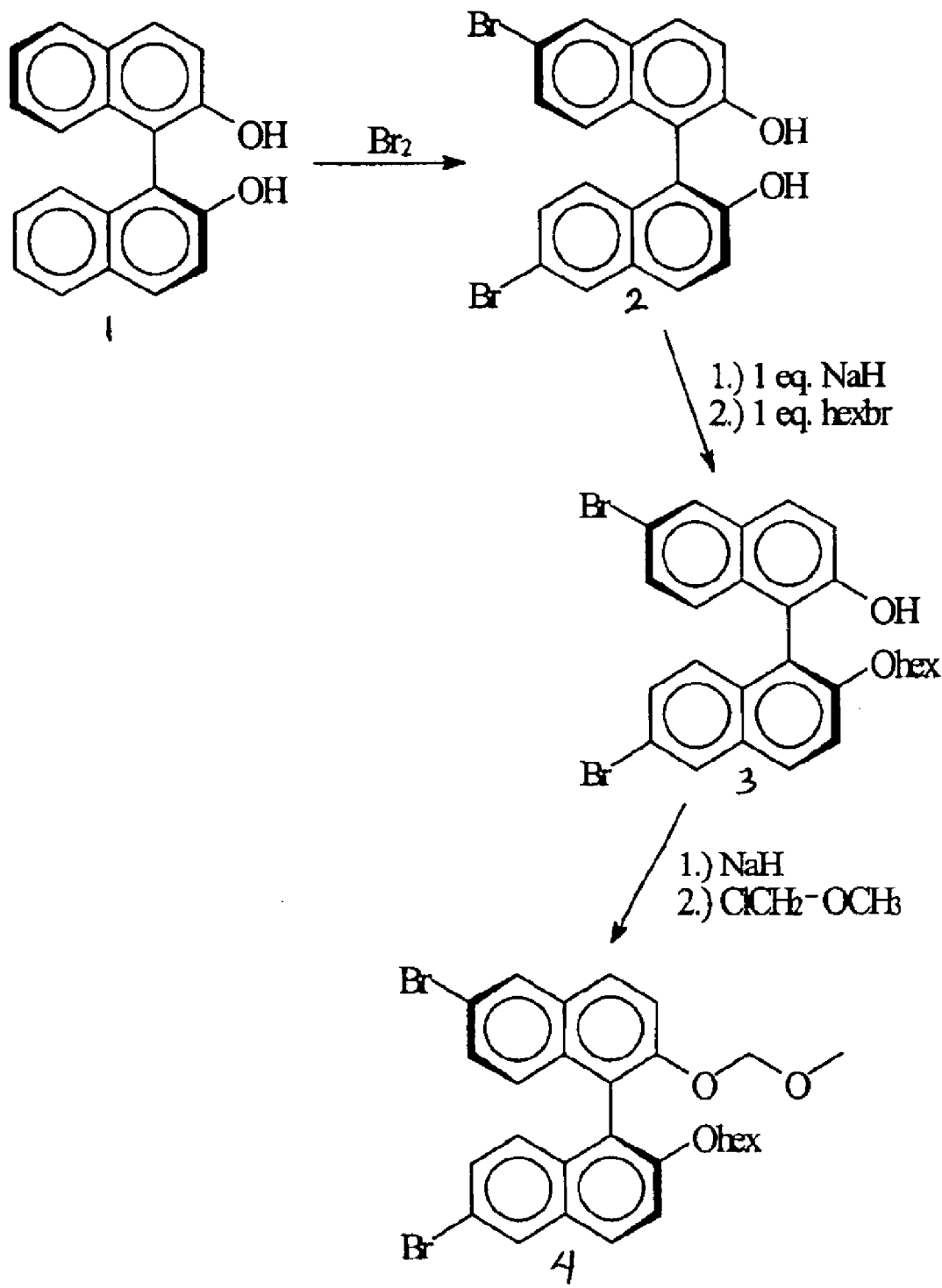
FIG. 2 depicts an exemplary synthetic route to an exemplary monomer 4.

In certain embodiments, the nonlinear optical chromophores are covalently attached to the helical backbone as side-groups (FIG. 1a) or directly incorporated into the helical backbone of a polymer (FIG. 1b). This may result in a chiral molecular structure with very large (molecular) nonlinearity. Next, the polymer may spontaneously assume the necessary $D_n$ symmetry for nonlinear response in the bulk or in a film. In one embodiment, helical nonlinear optical compounds spontaneously assume a $D_n$ symmetry when spincoated on a substrate. In one embodiment, the polymers have liquid crystalline properties that may provide the necessary symmetry. This natural ordering may create a thermodynamically stable system in which the nonlinearity does not decay as a function of time and temperature. The resulting structure may have a $\chi_{xyz}$ susceptibility component that is useful for practical applications. These systems may have an antiparallel alignment of the chromophores which will not destroy the nonlinear optical response, for example, in contrast to poled polymer films, since the presence of the xyz susceptibility does not require polar order.

In one embodiment, a chiral chromophore is linked to a non chiral polymer backbone, creating a compound with non centrosymmetric symmetry. In another embodiment, the chiral chromophore functionalized polymer may be racemic polybinaphthalene or poly(adamantylmethacrylate-methyl vinyl isocyanate) or a maleimide-adamantyl methacrylate copolymer. In one embodiment, the chiral chromophore functionalized polymer may be a flourinated chiral polymer, for example, poly(2-trifluoromethyl adamantylacrylate-methyl vinyl isocyanate), poly(2-trifluoromethyl perfluoro t-butyl acrylate-methyl vinyl isocyanate), and polymers based on perfluoro esters. In another embodiment, the chiral chromophore functionalized polymer may assume a helical configuration.

In another embodiment, a polymer and a chromophore may form a composition. In another embodiment, a polymer and chromophore may form a matrix. In yet another embodiment, a chromophore may be embedded in a polymer matrix, for example, a guest/host arrangement. In another embodiment, a chromophore may be used to cross-link polymer chains.

The polymer may contain one or two hydroxyl or amino functional groups per recurring monomeric unit. These functional groups can be used to functionalize the polymer with one or more chromophores per monomeric unit. In one embodiment, the chromophores are functionalized on the polymer using Mitsunobu reaction conditions. In another embodiment, the chromophores are functionalized via an amino group.

In one embodiment, the compounds or composites have electro-optic coefficients which are greater than 5 pm/V, greater than 10 pm/V, greater than 20 pm/V, greater than 30 pm/V or greater than 40 pm/V. In one embodiment, the compounds or composites are stable at temperatures up to at least 150° C., at least 200° C., or at least 250° C.

In another embodiment, methods of ordering the compounds or composites are, for example, stretching, formation of Langmuir-Blodgett films, or poling. In another embodiment, the macroscopic molecular orientation of the electro-optic compounds or compositions is controlled via interference of polarization by multiphoton pathways, for example, by a laser.

In another embodiment, the chiral or helical polymers are poled to enhance the nonlinear optical response. In yet another embodiment, the optically active compounds are poled.

Spincoating may result in completely isotropic samples that do not allow second harmonic generation. Surprisingly, second harmonic generation or nonlinearity may be observed from these chiral polymers, after spincoating and without further processing. In the case of the helicene molecules, they may organize into liquid crystalline-like layers that stack together, giving rise to $D_2$- and $D_\infty$-symmetry.

A polymer may be functionalized with a chromophore, creating compounds which may spontaneously assume a non-centrosymmetric symmetry. In one embodiment, compounds which display non-centrosymmetric symmetry may comprise chiral polymers which are functionalized with a chromophore. In another embodiment, compounds which display non-centrosymmetric symmetry may comprise polymers which are functionalized with a chiral chromophore.

A polymer may be any known polymer. Exemplary polymers include both chiral and achiral polymers, and include both aliphatic and aromatic polymers, including polyurethanes, polymethylmethacrylate, polyethers, polyetherimides, polyesters, polyimide, polymaleimides, poly(phenylquinoxalines), polyamic acid, polyamides, polysiloxanes, polyacrylates, polystyrene, polycarbonates derived from bisphenol, and polysulfones derived from bisphenol A, poly(2-methoxy, 5 ethyl (2' hexyloxy) paraphenylene vinylene) (MEH), BaytronP (Pedot-PSS), BHEP-PPV, $C_{60}$-PCBM, and polycarbonate.

Representative natural polymers include proteins, such as zein, modified zein, casein, gelatin, gluten, serum albumin, or collagen, and polysaccharides, such as cellulose, dextrans, hyaluronic acid, and polymers of alginic acid.

Representative synthetic polymers include polyphosphazines, poly(vinyl alcohols), polyamides, polycarbonates, polyalkylenes, polyacrylamides, polyanhydrides, poly(phosphoesters), polyalkylene glycols, polyalkylene oxides, polyalkylene terephthalates, polyvinyl ethers, polyvinyl esters, polyvinyl halides, polyvinylpyrrolidone, polyglycolides, polysiloxanes, polyphosphates and polyurethanes.

Synthetically modified natural polymers include alkyl celluloses, hydroxyalkyl celluloses, cellulose ethers, cellulose esters, and nitrocelluloses. Other like polymers of interest include, but are not limited to, methyl cellulose, ethyl cellulose, hydroxypropyl cellulose, hydroxypropyl methyl cellulose, hydroxybutyl methyl cellulose, cellulose acetate, cellulose propionate, cellulose acetate butyrate, cellulose acetate phthalate, carboxymethyl cellulose, cellulose triacetate and cellulose sulfate sodium salt.

The polymers may be provided as copolymers or terpolymers, or polymers with more than three species of monomers. The polymers may also include further subunits. These polymers may be obtained from chemical suppliers or synthesized from monomers obtained from these suppliers using standard techniques. In certain embodiments, the polymers are comprised almost entirely, if not entirely, of the same subunit. In other embodiments, the polymers may be copolymers, in which different subunits and/or other monomeric units are incorporated into the polymer. In certain instances, the polymers are random copolymers, in which the different subunits and/or other monomeric units are distributed randomly throughout the polymer chain. In certain embodiments, the polymer is a methylmethacrylate copolymer.

In other embodiments, the different types of monomeric units are distributed randomly throughout the chain. In part, the term "random" is intended to refer to the situation in which the particular distribution or incorporation of monomeric units in a polymer that has more than one type of monomeric units is not directed or controlled directly by the synthetic protocol, but instead results from features inherent to the polymer system, such as the reactivity, amounts of subunits and other characteristics of the synthetic reaction or other methods of manufacture, processing or treatment.

In certain embodiments, the subject polymers may be cross-linked. For example, substituents of the polymeric chain, may be selected to permit additional inter-chain cross-linking by covalent or electrostatic (including hydrogen-binding or the formation of salt bridges), e.g., by the use of a organic residue appropriately substituted. A chromophore may be used for cross-linking subject polymers.

A polymer may have a chain terminating group, by which the polymer terminates. Examples of such chain terminating groups include monofunctional alcohols and amines.

The ratio of different subunits in a polymer may vary. Alternatively, in other instances, the polymers are effectively composed of two different subunits, in which the ratio of the subunits may vary from less than 1:99 to more than 99:1, or alternatively 10:90, 15:85, 25:75, 40:60, 50:50, 60:40, 75:25, 85:15, 90:10 or the like.

In certain embodiments, the polymeric chains of the subject compounds and compositions, e.g., which include repetitive elements shown in any of the subject formulas, have molecular weights ranging from about 2000 or less to about 1,000,000 or more daltons; alternatively, ranging from about 10,000, 20,000, 30,000, 40,000, or 50,000 daltons to about 1,000,000 daltons. In one embodiment, the molecular weight (Mw) is about 5000 to about 30000. Number-average molecular weight (Mn) may also vary widely, but generally fall in the range of about 1,000 to about 200,000 daltons, from about 1,000 to about 40,000 daltons and, even from about 1,000 to about 20,000 daltons. Within a given sample of a subject polymer, a wide range of molecular weights may be present. For example, molecules within the sample may have molecular weights which differ by a factor of 2, 5, 10, 20, 50, 100, or more, or which differ from the average molecular weight by a factor of 2, 5, 10, 20, 50, 100, or more. One method to determine molecular weight is by gel permeation chromatography ("GPC"), e.g., mixed bed columns, THF solvent, $CH_2Cl_2$ solvent, light scattering detector, and off-line dn/dc. Other methods are known in the art.

Plasticizers and stabilizing agents known in the art may be incorporated in the polymers or compounds of this disclosure.

In one embodiment, the polymer has a molecular weight which allows formation of thin films, which may be about 0.1 to about 10 μm thick.

In another embodiment, the polymer has a high glass transition temperature to prevent decomposition of the polymer composition during processing. In one embodiment, the polymer has a glass transition temperature ($T_g$) between about 90° C. and about 250° C., or between about 110° C. and about 200° C.

In an embodiment, the polymers are chiral polymers. Chiral polymers include chiral polyisocyanates, chiral polyisocyanides, chiral binaphthyl-based polymers, chiral polyanilines, chiral polycarbonates, chiral polyisocyanides, chiral polyesters, chiral polyurethanes, chiral poly(aryl) esters, chiral poly(aryl)ethers, including polyetherimides, polyethersulfones, and polyetherketones, cellulose, chiral polyphenylene vinylene (PPV), chiral liquid crystalline polymers or compounds, and helicenes. Further chiral polymers include polymers comprising chiral spirobiindane moieties, chiral indane bisphenol moieties, and the like.

In a particular embodiment, the chiral polymers undergo spontaneous alignment. In one embodiment, the chiral polymers assume a helical configuration.

Chiral polymers may be polymers with symmetry groups $D_n$, (n>2 or n=2) $D_{2d}$, $C_{2v}$, $C_2$, $C_s$, and $C_1$. In one embodiment, the polymer has a $D_n$ (n>2 or n=2) symmetry. In another embodiment, the polymer has $D_\infty$ symmetry. In another embodiment, the symmetry of the chiral polymer is such that the second order macroscopic susceptibility component $\chi_{xyz}$ is non-zero. In a particular embodiment, the chiral polymers undergo spontaneous alignment, leading to a macroscopic chiral medium with nonvanishing macroscopic second-order nonlinear optical properties.

In another embodiment, the chiral polymers exhibit macroscopic nonlinearity without application of a shearing force or an electric field. In a further embodiment, the chiral polymers may be poled. In an even further embodiment, a poled chiral polymer may exhibit different hyperpolarizibility and different susceptibility components.

In one embodiment, a chiral polymer may be a bi-naphthyl based polymer. In an embodiment, a chiral polymer may have monomeric units comprising binaphthyl groups, binaphthol groups, or 1,1'-binaphthyl-2-ol-2'-amine groups, or a combination of these groups within the same monomeric unit or in distinct monomeric units. In one embodiment, a monomeric unit of a chiral polymer comprises a bi-naphthyl group linked to an alkyl, alkylene or alkynyl group or di-alkyl-phenyl group, wherein differing monomeric units of a polymer may comprise differing or the same groups.

In an embodiment, a chiral polymer may include one or more of recurring monomeric units selected from the group of formula I and II:

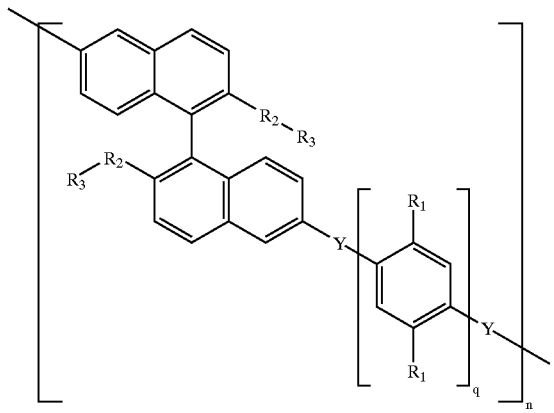

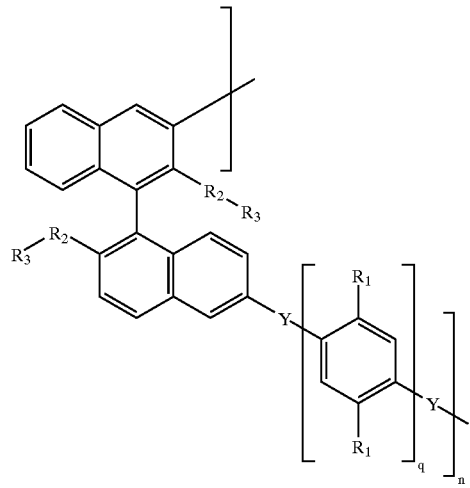

wherein

Y represents independently for each occurrence a bond, alkyl, alkenyl, or alkynyl;

$R_1$ represents independently for each occurrence H, alkyl, or alkoxy;

$R_2$ represents independently for each occurrence $N(R_1)$, O, S, Se or alkylene;

$R_3$ represents independently for each occurrence H or alkyl;

q is in the range 1 to 7 inclusive; and n is 1 to about 1000.

In one embodiment, $R_1$ is hexyl. In another embodiment, $R_3$ is hexyl.

In one embodiment, n is 1 to about 100. In another embodiment, n is 1 to about 50, and another embodiment, n is about 5 to about 50, and in a further embodiment, n is about 10 to about 50.

In another embodiment, a chiral polymer may include one or more of recurring monomeric units of selected from formula III or IV:

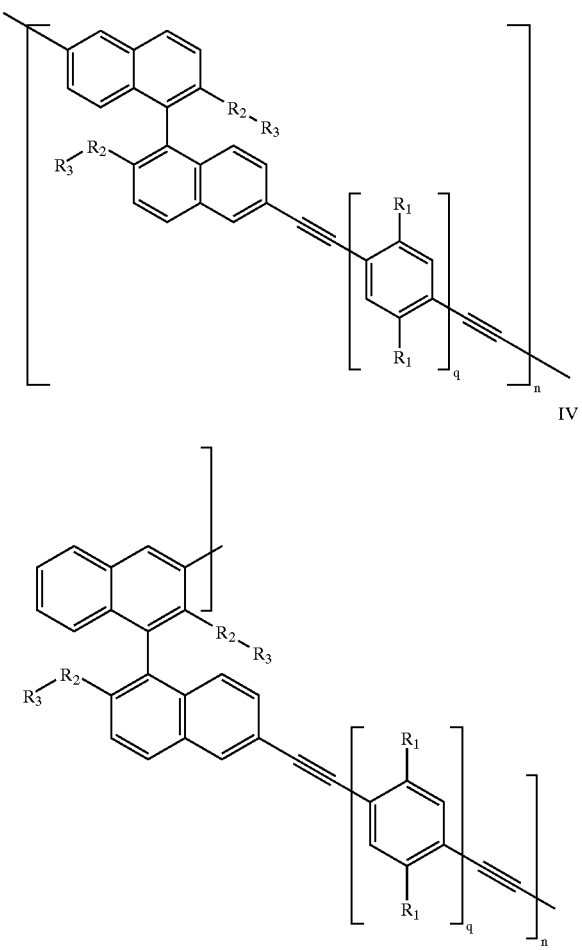

wherein:
R$_1$ represents independently for each occurrence H, alkyl or alkoxy;
R$_2$ represents independently for each occurrence N(R$_1$), O, S, Se or alkylene;
R$_3$ represents independently for each occurrence H or alkyl;
q is in the range 1 to 7 inclusive; and
n is 1 to about 1000.

In one embodiment, R$_1$ is hexyl. In another embodiment, R$_3$ is hexyl. In an embodiment, q is 1.

Chiral naphthyl based polymers may be prepared, for example, by a Suzuki coupling. Acetylenic derivatives of these polymers, for example, when Y is an acetylenic moiety, may be prepared via a Shinogashira reaction. Other methods of preparation which may be used include radical polymerization, and ionic polymerization.

A chromophore substituent is any substituent that exhibits a non-zero hyperpolarizablity β. Chromophores are charge-transfer substituents which have the general formula: (electron donor)(π-electron bridge)(electron acceptor). A continuous π electron chain, or bridge, chemically connects the electron donor groups and electron acceptor groups.

Exemplary chromophores include dyes, such as azo dyes; for example, dyes based on azobenzene, macrocycles, and bridged di-arenes. Chromophores include tricyanodiphenoquinodimethane dyes and residues; for example, 7-[4-(dimethylamino)phenyl]-7,8,8-tricyanoquinodimethane, amino-nitro-azobenzene dyes/residues, dicyanovinyl dyes, tetracyanobutadiene dyes, [(nitrophenylazo)phenylazo]phenyl amine dyes, dicyanomethylene pyran dues and their residues, and imidiazolium dyes and their residues.

In one embodiment, the electron donor groups may comprise, for example, —SH, -alkylthio, hydroxyl, alkyoxyl, alkyl, vinyl, halo, —NH$_2$, amino group and the like. In a particular embodiment, the electron donor groups are aliphatic amines, aromatic amines, or combinations of aliphatic and aromatic amines.

Electron accepting groups may comprise for example, nitro, haloalkyl, acyl, alkanoyloxy, alkoxysulfonyl, —CN, —NO$_2$, —COOH, —COCH$_3$, —CHO, —CONH$_2$, —CHC(CN)$_2$, —C(CN)C(CN)$_2$ and the like. In a particular embodiment, the chromophores have CN electron acceptor groups. In a particular embodiment, the chromophore is bonded to a chiral polymer via a electron donor group.

In a particular embodiment, the chromophore substituents or chromophores are represented by the structure:

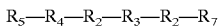

wherein
R$_1$ represents independently for each occurrence H, alkyl, alkenyl, alkoxy, or hydroxyl;
R$_2$ represents independently for each occurrence alkynyl, alkenyl, or

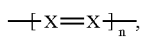

wherein X represents for each occurrence N or C; and n is an integer between 1 and 10 inclusive;
R$_3$ is selected from the group consisting of cycloalkenyls and unsaturated heterocycles;
R$_4$ is selected from the group consisting of:

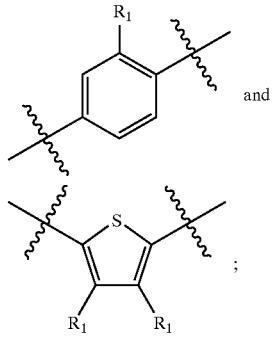

R$_5$ is alkyl, cycloalkyl, alkenyl, cycloalkenyl, aryl, alkylaryl, arylalkyl, heterocyclyl,

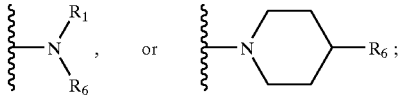

R$_6$ is alkyl, alkoxy or hydroxyl, including branched alkyls and alkoxyls exhibiting chirality;
R$_7$ is an electron acceptor group comprising at least one cyano group; and
the stereochemical configuration of a compound represented by 1 may be E or Z at an olefin; R, or S at a stereocenter; or any mixture of these configurations.

In a certain embodiment, R$_7$ may be a pyran or pyranone moiety.

In a certain embodiment, the chromophore substituents or chromophores are represented by the structure:

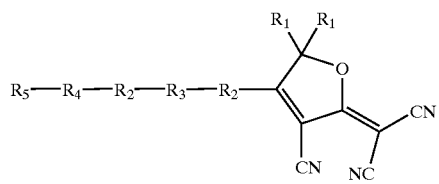

wherein $R_1$ represents independently for each occurrence H, alkyl, alkenyl, alkoxy, or hydroxyl;

$R_2$ represents independently for each occurrence alkenyl, or alkynyl;

$R_3$ is selected from the group consisting of:

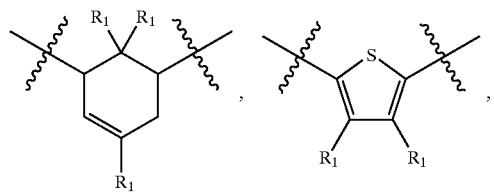

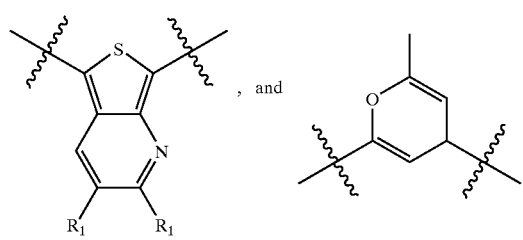, and 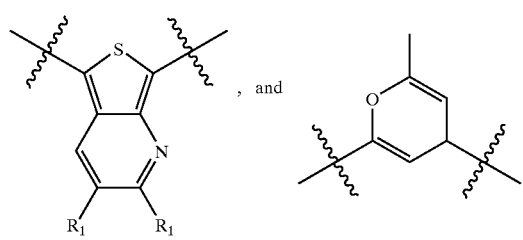;

$R_4$ is selected from the group consisting of:

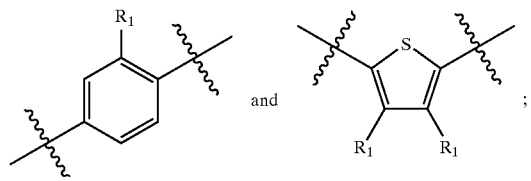 and 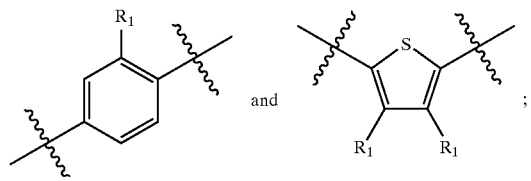;

$R_5$ is: 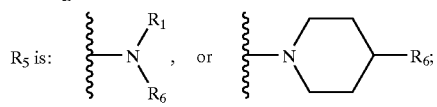, or 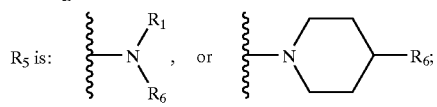;

$R_6$ is alkyl, alkoxy or hydroxyl including branched alkyls and alkoxyls exhibiting chirality; and the stereochemical configuration of a compound represented by 2 may be E or Z at an olefin; R or S at a stereocenter; or any mixture of these configurations.

In certain embodiments, the chromophore substitutes or chromophores are represented by the structure;

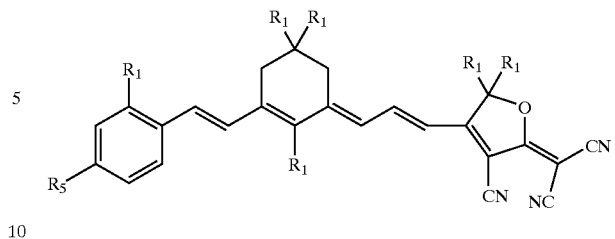

wherein $R_1$ represents independently for each occurrence H, alkyl alkenyl, alkoxy, or hydroxyl;

$R_5$ is:

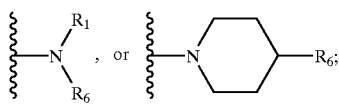

$R_6$ is alkyl, alkoxy or hydroxyl, including branched alkyls and alkoxyls exhibiting chirality; and the stereochemical configuration of a compound represented by 3 may be E or Z at an olefin; R, or S at a stereocenter; or any mixture of these configurations.

In certain embodiments, the chromophores are selected from the group consisting of:

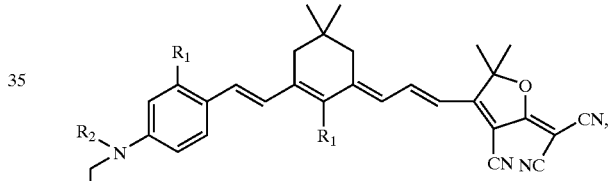

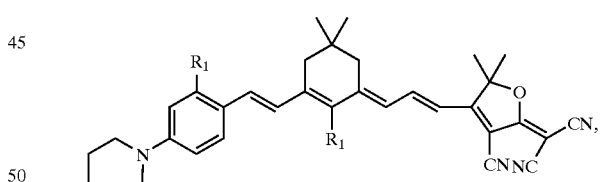

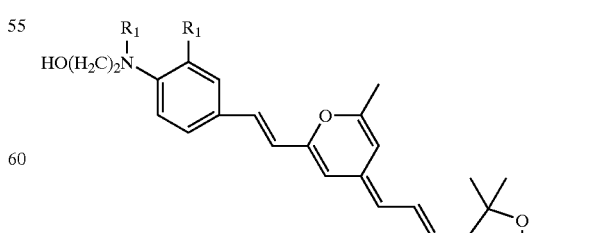

-continued

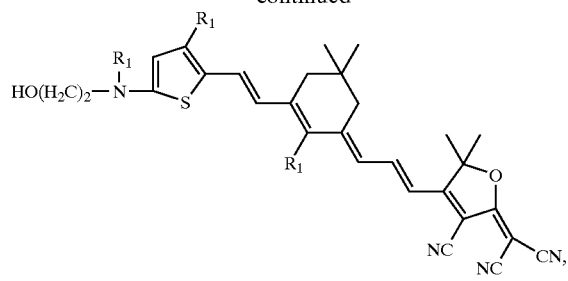

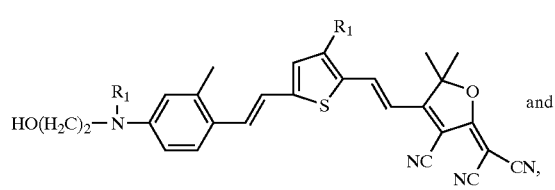

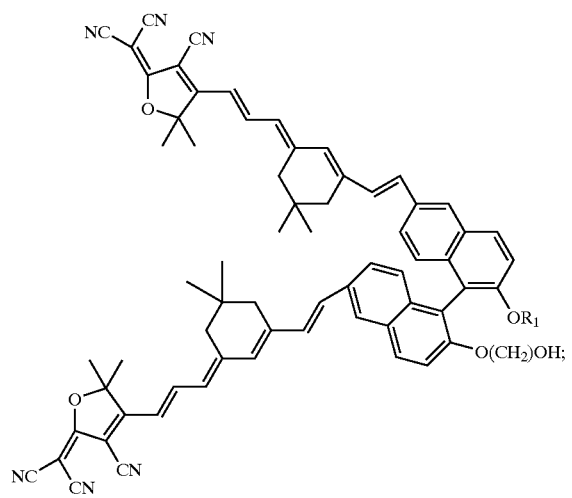

wherein
R$_1$ is H, alkyl or alkoxyl; and
R$_2$ is alkyl.

In certain embodiments, the chromophores are represented by:

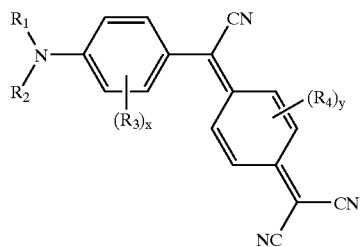

wherein

R$_1$ is independently hydrogen, halogen, alkyl, cycloalkyl, alkenyl, cycloalkenyl, aryl, alkylaryl, or arylalkyl;

R$_2$ is independently hydrogen, halogen, alkyl, cycloalkyl, alkenyl, cycloalkenyl, aryl, alkylaryl, or arylalkyl;

R$_3$ represents independently for each occurrence H, halogen, alkyl, cycloalkyl, alkenyl, cycloalkenyl, aryl, alkylaryl, arylalkyl, alkoxyalkyl, aryloxyalkyl, haloalkyl, or haloaryl;

R$_4$ represents independently for each occurrence H, halogen, alkyl, cycloalkyl, alkenyl, cycloalkenyl, aryl, alkylaryl, arylalkyl, alkoxyalkyl, aryloxyalkyl, haloalkyl, or haloaryl; and x and y are each independently 0 or an integer from 1 to 4.

In certain other embodiments, the chromophores are represented by:

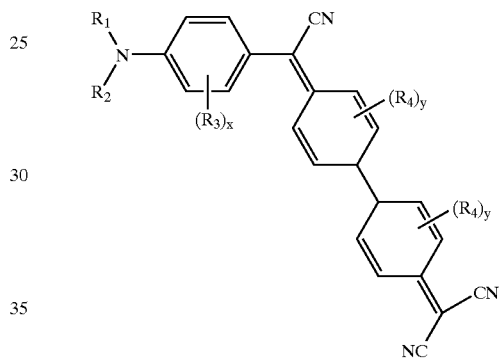

wherein

R$_1$ is independently hydrogen, halogen, alkyl, cycloalkyl, alkenyl, cycloalkenyl, aryl, alkylaryl, or arylalkyl;

R$_2$ is independently hydrogen, halogen, alkyl, cycloalkyl, alkenyl, cycloalkenyl, aryl, alkylaryl, or arylalkyl;

R$_3$ represents independently for each occurrence H, halogen, alkyl, cycloalkyl, alkenyl, cycloalkenyl, aryl, alkylaryl, arylalkyl, alkoxyalkyl, aryloxyalkyl, haloalkyl, or haloaryl;

R$_4$ represents independently for each occurrence H, halogen, alkyl, cycloalkyl, alkenyl, cycloalkenyl, aryl, alkylaryl, arylalkyl, alkoxyalkyl, aryloxyalkyl, haloalkyl, or haloaryl; and x and y are each independently 0 or an integer from 1 to 4.

In certain other embodiments, the chromophore may have a symmetry, chirality, or other optical property which upon bonding to a polymer or other moiety, renders that polymer or moiety chiral. Chiral chromophores may have chiral centers in the donor, acceptor or within the π electron bridge. Chiral chromophores which may induce chiral or non-centrosymmetric symmetry when linked to an achiral polymer include:

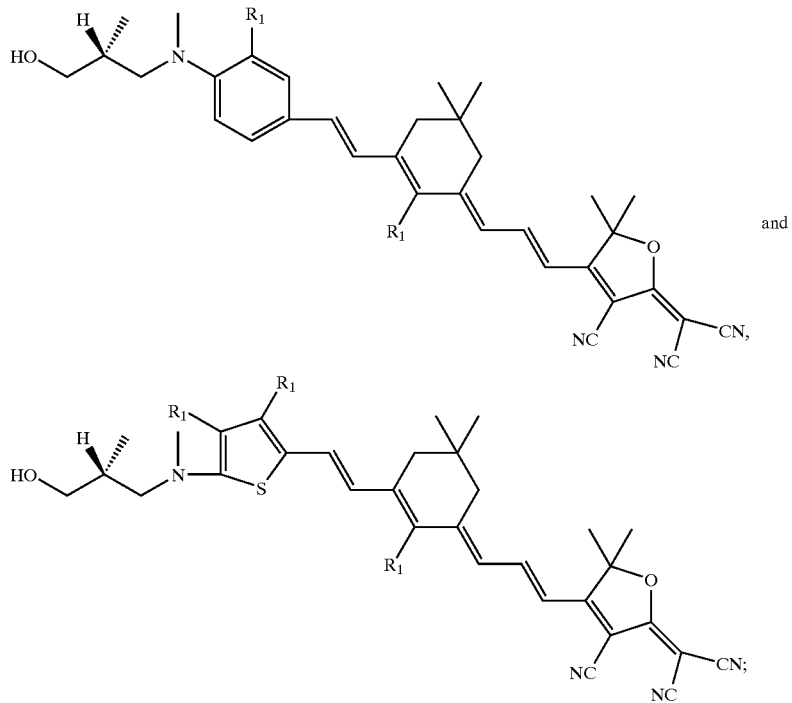

and wherein $R_1$ is alkyl or H; and the stereochemical configuration of these chromophores may be E or Z at an olefin; R, or S at a stereocenter; or any mixture of these configurations.

D. Devices

Optical fibers incorporated with optical materials are disclosed in commonly owned U.S. application Ser. No. 09/903387, entitled Method of Incorporating Optical Material Into an Optical Fiber, filed Jul. 11, 2001, and is hereby incorporated by reference and forms part of this disclosure.

An optical device may be any device which propagate electromagnetic waves with wavelengths in the optical region. For example, an optical device may be an optical waveguide which has a core region of higher refractive index surrounded by a region of lower refractive index, for example, cladding.

In an aspect of the present disclosure, an optical device is formed which comprises a substrate and at least one layer on said substrate, said layer including a composition or compound of the present disclosure.

In an aspect of the present disclosure, a wavelength converter of an optical waveguide type for propagating the fundamental wave comprises a compound or composition of the present disclosure. In an embodiment, the device, which comprises compounds of the disclosure, is used to modulate a beam of light. The modulation may be imposed on the phase, frequencey, amplitude, or direction of the modulated beam.

In an aspect of the present disclosure, a nonlinear optical device of a waveguide structure comprising a light transmitting medium as a waveguide in combination with an optical element, comprises an compound or composite of the present disclosure. In one embodiment, the nonlinear optical device is capable of performing a switching operation by application of a modulated electric field.

In yet another aspect, the present disclosure is directed to an optical waveguide structure comprising a light transmitting core and a cladding material partially or entirely enclosing the core. The light transmitting core is an electro-optical polymeric material, as described above, containing an electro-optical chromophore in admixture with a polymer or chemically bonded to the polymer. The cladding material is a photochromic polymeric material which exhibits a lower refractive index relative to that of the electro-optical polymeric material. The photochromic polymeric material comprises a second aliphatic or aromatic polymer identical in structure with the first polymer and a chromophore component.

In still another aspect, the present disclosure is directed to an optoelectronics device comprising a substrate holding at least a portion of a first, elongate waveguide propagating an optical signal along a propagation axis thereof, and a second waveguide positioned in optical proximity to the portion of the first waveguide. The optical waveguide structure of the present invention described above forms the second waveguide of the optoelectronics device. The second waveguide has a propagation axis aligned with the propagation axis of the portion of the first waveguide. The second waveguide is used for coupling optical energy to or from the optical signal propagating in the first waveguide.

In yet another aspect, the present disclosure is directed to an optical structure, typically an integrated optical structure, comprising an optical circuit disposed atop a substrate. The optical circuit comprises at least two optical devices and an optical waveguide, wherein each of the optical devices is optically coupled to and physically separated by a portion of the optical waveguide. The optical waveguide structure of the present invention described above is used as the optical waveguide in the inventive optical structure.

In still another aspect, the present disclosure is directed to an optoelectronics device comprising a substrate holding at least a portion of a first, elongate waveguide propagating an optical signal along a propagation axis thereof, and a second waveguide positioned in optical proximity to the portion of the first waveguide.

The optical waveguide structure described above forms the second waveguide of the optoelectronics device. The second waveguide has a propagation axis aligned with the propagation axis of the portion of the first waveguide. The second waveguide is used for coupling optical energy to or from the optical signal propagating in the first waveguide.

In yet another aspect, the present disclosure relates to an optical structure, typically an integrated optical structure, comprising an optical circuit disposed atop a substrate. The optical circuit comprises at least two optical devices and an optical waveguide, wherein each of the optical devices is optically coupled to and physically separated by a portion of the optical waveguide. The optical waveguide structure of the present invention described above is used as the optical waveguide in the inventive optical structure.

In one embodiment the compounds of the present disclosure are used in an optical device which modulates light. In another embodiment, the compounds of the present invention are used in a device which acts as an optical switch. Other devices contemplated by the present invention include optical storage devices and frequency doublers.

In another embodiment, the compounds of the present disclosure may be used in a polymer nano- or microstructure on a semiconducting or insulating surface.

In a further embodiment, the device is hermetically sealed or comprises a nonoxidizing cladding layer which may prevent oxidization. In another further embodiment, a cladding layer may be used in a device which may comprise either chiral or achiral components.

Advantages afforded by the optical waveguide structures of the present disclosure over present waveguides include higher electro-optical coefficients, greater long-term stability, and easier processing.

EXEMPLIFICATION

The invention now being generally described, it will be more readily understood by reference to the following examples, which are included merely for purposes of illustration of certain aspects and embodiments of the present invention, and are not intended to limit the invention.

Example 1

Synthesis of S-(+)-6,6'-dibromo-[1,1'-binaphthalene] 2

In a round-bottomed flask of 500 ml, 10.0 g (35.0 mmol) of S-(−)-[1,1'-binaphthalene]-2,2'-diol 1 is dissolved in 200 ml of dichloromethane and cooled down to −78 C. The flask is equipped with a $CaCl_2$-tube. Under vigorously stirring, 5.4 ml (105 mmol) of bromine, dissolved in 50 ml of dichloromethane, is dropwise added over 30 minutes. The mixture is allowed to reach room temperature and 200 ml of a $NaHSO_3$-solution (2 M) is added. The organic layer is washed two times with brine and dried over $MgSO_4$. After evaporation of the solvent, the compound is collected as a grey solid.

Yield: 15.5 g (100%);$[\alpha]_D^{25}$=+137 deg $dm^{-1}$ $mol^{-1}$ l (c=1.0 in $CH_2Cl_2$)

$^1$H-NMR ($CDCl_3$): δ(ppm): 8.07(d, J=1.5 Hz, 2H), 7.91 (d, 2H), 7.42(dd, 2H), 7.28(d, 2H), 6.98(d, 2H), 5.03(s, 2H)

Example 2

Synthesis of S-(−)-6,6'-dibromo-2'-hexyloxy-[1,1'-binaphthalene]-2-ol 3

Under argon atmosphere a solution of 14.4 g (32.4 mmol) of 2, dissolved in 70 ml of dry DMF, is slowly added to a suspension of 0.78 g (32.4 mmol) of NaH in 30 ml dry DMF. After 15 minutes, 4.6 ml (32.4 mmol) of hexylbromide and 100 mg of anhydrous NaI is added. The mixture is stirred overnight at 50° C. After cooling down, the mixture is poured into 200 ml of water and extracted with dichloromethane. The organic layer is washed with a saturated $NaHCO_3$-solution, with brine and dried over $MgSO_4$. After removal of the solvents, the crude compound is purified with column chromatography (silicagel; eluent: hexane/dichloromethane (60:40 v/v)) and isolated as an oil.

Yield: 8.2 g (48%); $[\alpha]_D^{25}$=+32.4 deg $dm^{-1}$ $mol^{-1}$ l (c=0.06 in $CHCl_3$)

$^1$H-NMR ($CDCl_3$): δ(ppm): 8.05(d, J=1.5 Hz, 1H), 8.00 (d, J=1.5 Hz, 1H), 7.93 (d, 1H), 7.80 (d, 1H), 7.46 (d, 1H), 7.34 (d, 1H), 7.34 (dd, 1H), 7.28 (dd, 1H), 7.02 (d, 1H), 6.86 (d, 1H), 4.89 (d, 1H), 3.99 (m, 2H), 1.43 (qu, 2H), 1.01 (m, 6H), 0.75 (t, 3H)

Example 3

Synthesis of S-(−)-6,6'-dibromo-2-hexyloxy-2'-methoxymethoxy-[1,1'-binaphthalene] 4

Under argon atmosphere a solution of 5.28 g (10.0 mmol) of 3, dissolved in 30 ml of dry THF, is slowly added to a suspension of 0.57 g (12.0 mmol) of NaH in 20 ml of dry THF. After 15 min, 0.90 ml (12.0 mmol) of chloromethyl-methylether is added very slowly and the mixture is stirred overnight at room temperature. The reaction mixture is poured into 100 ml of water and extracted with dichloromethane. The organic layer is washed with a saturated $NaHCO_3$-solution, with brine and dried over $MgSO_4$. After removal of the solvents, the crude compound is purified with column chromatography (silicagel; eluent: hexane/dichloromethane (60:40 v/v)) and isolated as an oil.

Yield: 4.70 g (82%); $[\alpha]_D^{25}$=−156 deg $dm^{-1}$ $mol^{-1}$ l (c=3.30 in $CHCl_3$)

$^1$H-NMR ($CDCl_3$): δ(ppm): 8.01 (d (br), 2H), 7.85 (d, 1H), 7.82 (d, 1H), 7.56 (d, 1H), 7.42 (d, 1H), 7.34 (dd, 1H), 7.28 (dd, 1H), 7.00 (d, 1H), 6.94 (d, 1H), 5.30(s, 1H), 5.07(d, 1H), 4.96 (d, 1H), 3.95 (m, 2H), 3.17 (s, 3H), 1.37 (m, 2H), 1.0 (m, 6H), 0.73 (t, 3H)

Example 4

Synthesis of 1,4-dihexyloxybenzene 6

Under argon atmosphere, 6.90 g (300 mmol) of Na is reacted with 200 ml of absolute ethanol. Then, 16.5 g (150 mmol) of hydroquinone 5 is added, followed by 42.2 ml (300 mmol) of hexylbromide and 200 mg of anhydrous NaI. The mixture is refluxed overnight. Ethanol is evaporated under reduced pressure and water (150 ml) is added. The product is extracted with dichloromethane and dried over $MgSO_4$. After filtration, the solvents are removed and the crude compound is recrystallized from ethanol.

Yield: 31.2 g (75%); m.p.: 45.5° C.

$^1$H-NMR ($CDCl_3$): δ(ppm): 6.82 (s, 4H), 3.89 (t, 4H), 1.72 (qu, 4H), 1.4 (m, 12H), 0.90 (t, 6H)

Example 5

Synthesis of 2,5-dihexyloxy-1,4-dibromobenzene 7

In a round-bottomed flask of 500 ml, 27.8 g (100 mmol) of 6 is dissolved in 300 ml of dichloromethane and cooled down to −78° C. The flask is equipped with a $CaCl_2$-tube. Under vigorously stirring, 14.4 ml (280 mmol) of bromine, dissolved in 100 ml of dichloromethane, is slowly added. The mixture is allowed to reach room temperature and 400 ml of $NaHSO_3$-solution (2 M) is added. The organic layer is washed with a saturated $NaHCO_3$-solution, with brine and dried over $MgSO_4$. After evaporation of the solvent, the compound is recrystallized from ethanol.

Yield: 38.0 g (87%); m.p.: 63.6° C.

$^1$H-NMR ($CDCl_3$):δ(ppm): 7.08 (s, 2H), 3.94 (t, 4H), 1.80 (qu, 4H), 1.4 (m, 12H), 0.90 (t, 6H)

Example 6

Synthesis of 2,5-dihexyloxy-benzene-1,4-diboronic acid 8

A solution of 6.53 g (15.0 mmol) of 7 in 80 ml of dry THF is purged with argon and cooled to −78° C. 23 ml (54.0 mmol) of n-BuLi (2.34 M in hexane) is added. This mixture is stirred during 15 minutes and then dropwise added to a solution of 15 ml triethylborate in 20 ml of dry THF. The solution is allowed to reach room temperature and stirred overnight. Then, 150 ml of HCl (1 M) is added and the reaction mixture is vigorously stirred for 3 h. The precipitate is filtered off, washed thoroughly with water and dichloromethane and dried.

Yield: 38.0 g (87%); $T_m$: 63.6° C.

$^1$H-NMR (CDCl$_3$): δ(ppm): 7.80 (s (br), 4H), 7.19 (s, 2H), 3.97 (t, 4H), 1.72 (qu, 4H), 1.4 (m, 12H), 0.83 (t, 6H)

Example 8

Synthesis of S-6,6'-di(trimethylsilylethynyl)-[1,1'-binaphthalene]-2,2'-diol 9

Prior to use, 2 is recrystallized from toluene/hexane. 11.1 g (25.0 mmol) of 2. 250 mg of Pd[PPh$_3$]Cl$_2$ and 500 mg of PPh$_3$ are dissolved in 50 ml of dry piperidine. The solution is purged with argon and heated to 40° C. Then, 9.9 ml (70.0 mmol) of trimethylsilylacetylene is injected, followed by an argon purged solution of 200 mg of CuI and 1.0 g of LiBr in 10 ml of dry THF. The reaction mixture is refluxed for 1 h under argon atmosphere. After cooling, the mixture is poured into 400 ml of a HCl-solution (1 M) and extracted with dichloromethane. The combined organic layers are washed with a HCl-solution (1 M), with a saturated NaHCO$_3$-solution, with brine and finally dried over MgSO$_4$. The solvents are removed and the crude product is purified by column chromatography (silicagel; eluent: ethylacetate/dichloromethane (30:70 v/v)). The compound is immediately used in the next step.

Example 9

Synthesis of S-(+)-6,6'-diethynyl-[1,1'-binaphthalene]-2,2'-diol 10

A solution of 9 in 70 ml of methanol and 30 ml of THF is purged with argon and treated with 25 ml of a NaOH-solution (2 M). The mixture is vigorously stirred for 1 h at 40° C. under argon atmosphere and then neutralized with a HCl-solution (2 M) and extracted with dichloromethane. The combined organic layers are washed with a saturated NaHCO$_3$-solution, with brine and dried over MgSO$_4$. The solvents are removed and the crude compound is purified with column chromatography (silicagel; eluent: ethylacetate) and collected as a yellow oil.

Yield=5.7 g (68%) (2 steps); $[α]_D^{25}$=+111 deg dm$^{-1}$ mol$^{-1}$ l (c=0.5 in CH$_2$Cl$_2$)

$^1$H-NMR (CDCl$_3$): δ(ppm): 8.06 (d, J=1.5 Hz, 2H), 7.93 (d, 2H), 7.38 (d, 2H), 7.34 (dd, 2H), 7.04 (d, 2H), 5.18 (s, 2H), 3.11 (s, 2H)

Example 10

Synthesis of S-6,6'-di(trimethylsilylethynyl)-2'-hexyloxy-[1,1'-binaphthalene]-2-ol 11

The procedure described for 9, was followed, starting from 5.28 g (10.0 mmol) of 3. The compound is purified with column chromatography (silicagel; eluent: ethylacetate/hexane (10:90 v/v)).

Example 11

Synthesis of S-(+)-6,6'-diethynyl-2'-hexyloxy-[1,1'-binaphthalene]-2-ol 12

The procedure, described for 10, was followed, starting from 11. The compound is purified by column chromatography (silicagel; eluent: ethylacetate/hexane (20:80 v/v) and (10:90 v/v)).

Yield=3.0 g (71%) (2 steps); $[α]_D^{25}$=+32.0 deg dm$^{-1}$ mol$^{-1}$ l (c=1.0 in CH$_2$Cl$_2$)

$^1$H-NMR (CDCl$_3$): δ(ppm): 8.05 (d, J=1.5 Hz, 1H), 8.00 (d, 1.5 Hz, 1H), 7.96 (d, 1H), 7.82 (d, 1H), 7.44 (d, 1H), 7.32 (d, 1H), 7.29 (dd, 1H), 7.21 (dd, 1H), 7.08 (d, 1H), 6.92 (d, 1H), 4.94 (s, 1H), 3.93 (m, 2H), 3.09 (s, 1H), 3.05 (s, 1H), 1.43 (m, 2H), 1.0 (m, 6H), 0.75 (t, 3H)

Example 12

Compound 13

A solution of 9.65 g (50.0 mmol) of 6, 11.4 g (45.0 mmol) of I$_2$, 5.25 g (30.0 mmol) of KIO$_3$ in 15 ml of H$_2$SO$_4$ (15%), 20 ml of CCl$_4$ and 90 ml of glacial acetic acid is stirred at 75° C. for 3 h. After cooling, the precipitate is filtered, washed with cold methanol and recrystallized twice from ethanol to give white needles.

Yield: 13.8 g (52%); $T_m$: 59.8° C.

$^1$H-NMR (CDCl$_3$): δ(ppm): 7.18 (s, 2H), 3.93 (t, 4H), 1.80 (qu, 4H), 1.4 (m, 12H), 0.91 (t, 6H)

Example 13

2.65 g (5.00 mmol) of 4, 1.82 g (5.00 mmol) of 8 and 290 mg (250 μmol) of Pd(0)[PPh$_3$]$_4$ are dissolved in 25 ml of dry THF. The solution is purged with argon and 15 ml of a K$_2$CO$_3$-solution (1 M in water) is added. The reaction mixture is refluxed for two days under argon atmosphere while vigorously stirred. After cooling down, water is added and the polymer is extracted with dichloromethane. The polymer solution is washed with brine, dried over anhydrous Na$_2$SO$_4$ and concentrated. The polymer is precipitated in methanol and filtered off. Finally, the polymer is redissolved in THF and reprecipitated in methanol and then dried under reduced pressure.

Then, the obtained MOM-protected polymer is dissolved in 25 ml of THF. The solution is purged with argon and treated with 25 ml of HCl (6 M). The mixture is refluxed overnight under argon atmosphere. After cooling down, water is added and the polymer is extracted with dichloromethane. The organic layer is washed with a saturated NaHCO$_3$-solution, with brine and dried over anhydrous Na$_2$SO$_4$. The polymer solution is then concentrated and the polymer is precipitated in methanol. After filtration and drying, the polymer is redissolved in THF and reprecipitated in methanol. This procedure is repeated twice.

Yield: 2.8 g (86%)

$^1$H-NMR (CDCl$_3$): δ(ppm): 8.13 (s, 1H), 8.09 (s, 1H), 8.04 (d, 1H), 7.90 (d, 1H), 7.57 (d, 1H), 7.52 (d, 1H), 7.46 (d, 1H), 7.34 (d, 1H), 7.28 (d, 1H), 7.13 (d 1H), 7.07 (d, 2H), 4.98 (s, 1H), 3.9 (m, 6H), 1.6 (m, 4H), 0.9–1.6 (m, 20H), 0.75 (t, 9H)

Example 14

A general procedure is as follows: a solution of 2.50 mmol of 13, 25.0 mg of Pd[PPh$_3$]$_2$Cl$_2$ and 50.0 mg of PPh$_3$ in 10 ml of freshly distilled piperidine and 5 ml of dry THF, is purged with argon and heated to 40° C. A purged solution of 2.50 mmol of compounds 10/12 in 10 ml of dry THF is added, followed by a purged solution of 2.0 mg of CuI and 10.0 mg of LiBr in 10 ml of dry THF. The reaction mixture is stirred for two days under reflux and inert atmosphere.

After cooling down, THF is added and the polymer is precipitated in methanol. For purification, the polymer is three times redissolved in THF and reprecipitated in methanol.

In case of PPOL 2, the reaction mixture is not diluted with THF, neither is the polymer afterwards dissolved in THF, but DMF is used instead.

PPOL 2:

Yield: 1.7 g (95%)

$^1$H-NMR (CDCl$_3$): δ(ppm): 7.80 (s (br), 2H), 7.74 (d, 2H), 7.18 (d, 2H), 7.16 (dd, 2H), 6.95 (s, 2H), 6.94 (d, 2H), 5.41 (s, 2H), 3.93 (t, 4H), 1.82 (m, 4H), 1.35 (m, 4H), 1.20 (m, 8H), 0.76 (t, 6H)

PPOL 3:

Yield: 2.3 g (86%)

$^1$H-NMR (CDCl$_3$): δ(ppm): 8.09 (d, J=1.5 Hz, 1H), 8.06 (d, J=1.5 Hz, 1H), 7.98 (d, 1H), 7.86 (d, 1H), 7.46 (d, 1H), 7.38 (d, 1H), 7.33 (dd, 1H), 7.29 (dd, 1H), 7.14 (d, 1H), 7.03 (s, 2H), 7.00 (d, 1H), 5.00 (s, 1H), 3.9 (m, 6H), 1.82 (m, 4H), 0.9–1.6 (m, 20H), 0.86 (t, 6H), 0.75 (t, 3H)

Example 16

Functionalization of Polymers

A general procedure is as follows. Prior to reaction, the chromophore is recrystallized and all reagents and solvents are thoroughly dried. For 0.333 mmol of naphthol groups (PPOL 1–3), 0.400 mmol of chromophore and 0.666 mmol of PPh$_3$ are dissolved in 15 ml of dry THF. The mixture is purged with argon and 0.666 mmol of diethylazodicarboxylate (DEAD) is injected. The reaction vessel is sealed (septum) and the reaction mixture is stirred for two days at room temperature. Then, the polymer is precipitated in methanol, filtered and dried in vacuo. Finally, the polymer is redissolved in THF, precipitated in methanol and dried. This procedure is repeated until the filtrate is only slightly colored.

Example 17

Synthesis of Chromophore 28

Synthesis of 2-(N-ethyl-N-phenylamino)ethanol 15

A mixture of 101 ml (800 mmol) of freshly distilled N-ethylaniline 14, 71.0 ml (1.00 mol) of 2-bromoethanol, 138 g (1.00 mol) of anhydrous K$_2$CO$_3$ and 8.30 g (50.0 mmol) of anhydrous KI is dissolved in 300 ml of dry n-butanol is refluxed for four days under argon atmosphere and vigorously stirring. After cooling down, the inorganic salts are filtered off and washed with diethylether. The solvents are evaporated under reduced pressure and the crude reaction product is purified by means of a vacuum destillation.

Yield: 70.5 g (53%); b.p.: 123° C./1 mm Hg $^1$H-NMR (CDCl$_3$): δ(ppm): 7.20 (t, 2H), 6.78 (d, 2H), 6.72 (t, 1H), 3.78 (q, 2H), 3.46 (t, 2H), 3.41 (q, 2H), 1.76 (t, 1H), 1.15 (t, 3H)

Synthesis of 2-(N-ethyl-N-phenylamino) ethylethanoate 16

A mixture of 49.6 g (300 mmol) of 15 and 50 ml of acetic acid anhydride in a 250 ml-flask, equipped with a CaCl$_2$-tube is stirred overnight at 60° C. Then, the volatile compounds are evaporated and the crude product is distilled under vacuum.

Yield: 58.5 g (96%); b.p.: 129° C./0.15 mm Hg $^1$H-NMR (CDCl$_3$): δ(ppm): 7.21 (t, 2H), 6.72 (d, 2H), 6.68 (t, 1H), 4.22 (t, 2H), 3.55 (t, 2H), 3.40 (q, 2H), 2.05 (s, 3H), 1.17 (t, 3H)

Synthesis of 2-[N-ethyl-N-(4-formylphenyl)amino] ethylethanoate 17

To 60 ml of dry DMF in a 250 ml-flask, equipped with a CaCl$_2$-tube, cooled in an ice bath, 29.1 (310 mmol) of OPCl$_3$ is dropwise added and the mixture is stirred for two h at 5° C. Then, 58.5 g (288 mmol) of 16, dissolved in 30 ml of dry DMF, is added and the reaction mixture is stirred for 3 h at 90° C. After cooling down, the mixture is poured into iced water, stirred for 30 min and extracted with dichloromethane. The organic layer is washed with a saturated NaHCO$_3$-solution, with brine and dried over MgSO$_4$. After evaporation of the solvent, the compound is purified with column chromatography (silicagel; eluent:dichloromethane/acetonitrile (90:10 v/v)) and collected as an oil.

Yield: 59.2 g (87%)

$^1$H-NMR (CDCl$_3$): δ(ppm): 9.74 (s, 1H), 7.73 (d, 2H), 6.74 (d, 2H), 4.26 (t, 2H), 3.65 (t, 2H), 3.50 (q, 2H), 2.05 (s, 3H), 1.23 (t, 3H)

Synthesis of 4-[N-ethyl-N-(2-hydroxyethyl)amino] benzaldehyde 18

A 150 ml of NaOH-solution (5 M in water) is added to a solution of 59.2 g (252 mmol) of 17 in 200 ml of ethanol and the mixture is stirred overnight at 40° C. The reaction mixture is cooled in an ice bath and neutralized with HCl (5 M) and extracted with dichloromethane. The organic layer is washed with a saturated NaHCO$_3$-solution, with brine and dried over MgSO$_4$. The solvents are evaporated under reduced pressure. The product is isolated as an oil and used without further purification.

Yield: 48.7 g (100%)

$^1$H-NMR (CDCl$_3$): δ(ppm): 9.68 (s, 1H), 7.67 (d, 2H), 6.72 (d, 2H), 3.84 (t, 2H), 3.56 (t, 2H), 3.50 (q, 2H), 2.00 (s (br), 1H), 1.20 (t, 3H)

Synthesis of 2-[N-ethyl-N-[4-[2-(2-thien)ethenyl] phenyl]amino]ethanol 22

To a solution of 48.3 g (250 mmol) of 18 and 110 g (250 mmol) of 21 in 500 ml of absolute ethanol, 250 ml (375 mmol) of a NaOEt-solution (1.5 M in ethanol) is dropwise added and the reaction mixture is refluxed for 5 h under argon atmosphere. Then, the mixture is cooled down, poured into 500 ml of iced water and extracted with dichloromethane. The combined organic layers are washed with a saturated NaHCO$_3$-solution, with brine and dried over MgSO$_4$. After evaporation of the solvent, the compound is purified with column chromatography (silicagel; eluent:dichloromethane/ethylacetate (90:10 v/v)). The product is isolated as a mixture of cis and trans (cis/trans 4/6).

Yield: 51.7 g (76%); Tm: 101.2° C.

$^1$H-NMR (CDCl$_3$): trans: δ(ppm): 7.34 (d, 2H), 7.10 (m, 1H), 7.03 (d, J=15.7 Hz, 1H), 6.95 (m, 2H), 6.85 (d, J=15.7 Hz, 1H), 6.74 (d, 2H), 3.81 (q, 2H), 3.45 (m, 4H), 1.64 (t, 1H), 1.17 (t, 3H)

cis: δ(ppm): 7.26 (d, 2H), 7.10 (m, 1H), 6.95 (m, 2H), 6.72 (d, 2H), 6.54 (d, J=12.1 Hz, 1H), 6.53 (d, J=12.1 Hz, 1H), 3.81 (q, 2H), 3.45 (m, 4H), 1.64 (t, 1H), 1.17 (t, 3H)

Synthesis of 2-[2-[4-[N-ethyl-N-[2-[(t-butyldimethyl)silyloxy]ethyl]amino]phenyl]ethenyl]-thiophene 23

In a 250 ml-flask, equipped with a CaCl$_2$-tube, 51.7 g (189 mmol) of 22 and 34.2 g (227 mmol) of t-butyldimethylsilylchloride are dissolved in 100 ml of dry DMF. The solution is cooled in an ice bath and 30.9 g (454 mmol) of imidazole is added in several portions. The reaction mixture is stirred overnight at 40° C. After cooling, water is added and the mixture is extracted with pentane. The combined organic layers are washed with a saturated NaHCO$_3$-solution, with brine and dried over MgSO$_4$. The solvents are evaporated under reduced pressure. The product is isolated as an oil and used without further purification (cis/trans 3.7/6.3).

Yield: 74.7 g (100%)

$^1$H-NMR (CDCl$_3$): trans: δ(ppm): 7.29 (d, 2H), 7.05 (m, 1H), 7.03 (d, J=16.4 Hz, 1H), 6.87 (m, 2H), 6.80 (d, J=16.4 Hz, 1H), 6.74 (d, 2H), 3.72 (t, 2H), 3.39 (m, 4H), 1.12 (t, 3H), 0.83 (t, 9H), 0.06 (s, 6H)

cis: δ(ppm): 7.26 (d, 2H), 7.05 (m, 1H), 6.87 (m, 2H), 6.72 (d, 2H), 6.54 (d, J=12.1 Hz, 1H), 6.53 (d, J=12.1 Hz, 1H), 3.72 (t, 2H), 3.39 (m, 4H), 1.12 (t, 3H), 0.83 (t, 9H), 0.06 (s, 6H)

Synthesis of 2-[2-[4-[N-ethyl-N-(2-hydroxyethyl)amino]phenyl]ethenyl]thien-5-al 24

A solution of 41.8 g (108 mmol) of 23 in 300 ml of dry THF is purged with argon, cooled to −78° C. and 94 ml (220 mmol) of n-Buli (2.34 M in hexane) is added. The solution turns dark blue. The temperature is slowly rised to −30° C. and 35 ml of dry DMF is added. Upon addition, the solution becomes yellow. After 2 h of stirring at −30° C., 500 ml of HCl (2 M) is added (the solution turns deep red) and the mixture is vigorously stirred at 40° C. for 4 h. After cooling, the reaction mixture is neutralized with NH$_3$ (5 M) and extracted with dichloromethane. The combined organic layers are washed with a saturated NaHCO$_3$-solution, with brine and dried over MgSO$_4$. After evaporation of the solvents, the compound is purified with column chromatography (silicagel; eluent:dichloromethane/ethylacetate (90:10 v/v)) and recrystallized from chloroform/hexane. No cis-isomer is detected.

Example 18
Physical Properties

| Polymer | $\overline{M}_n$/ $10^3$ g mol$^{-1}$ | D | $[\alpha]_D^{25}$/ $10^2$ deg dm$^{-1}$ gm$^{-1}$ ml |
|---|---|---|---|
| PPOL 1 | 7.1 | 2.4 | 1.5 |
| PPOL 2 | 5.4 | 2.6 | 5.2 |
| PPOL 3 | 2.3 | 2.3 | 3.8 |

$\overline{M}_n$ is determined with GPC towards polystyrene standards in THF; D=$\overline{M}_w$/$\overline{M}_n$

Example 19
Electro-optic Coefficients and Tg of Functionalized Polymers

Figure 9:
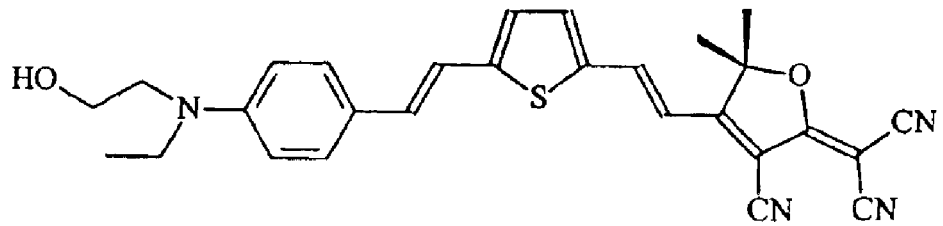
FIG. 9 depicts an exemplary synthetic route to an exemplary chromophore functionalized polymer.
Figure 9:
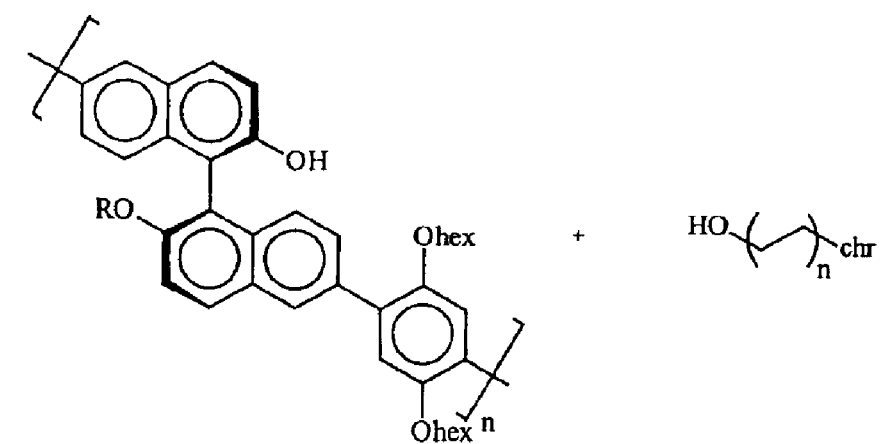
Figure 9:
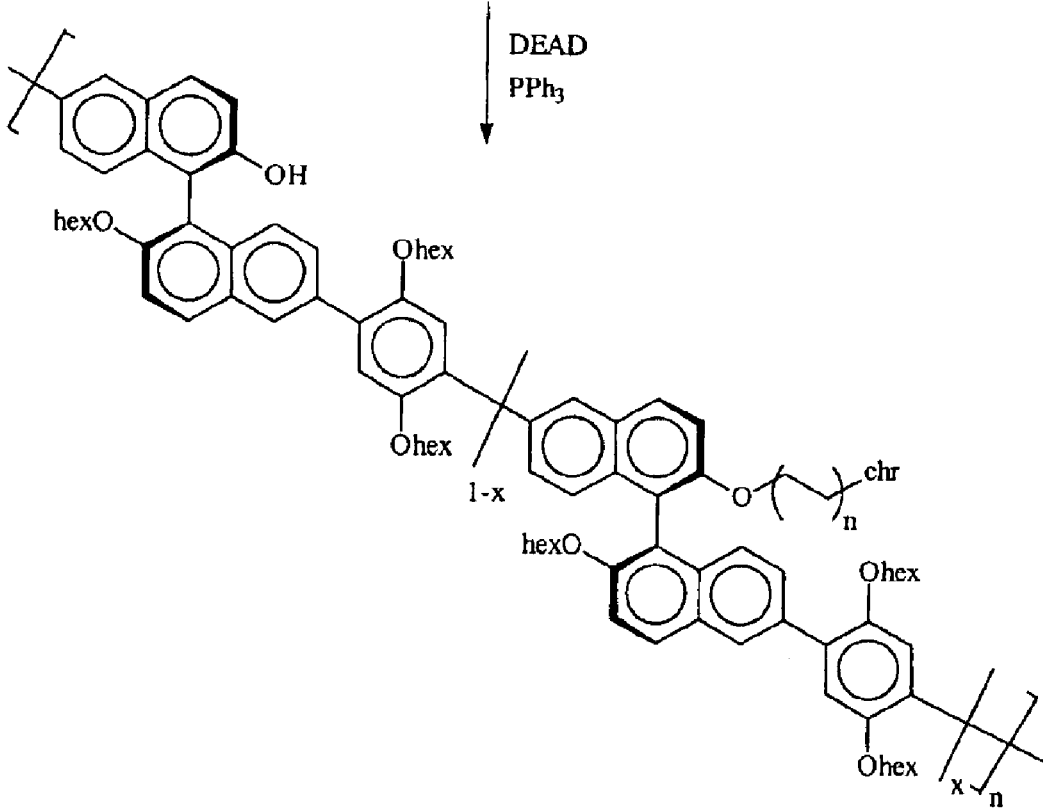
Figure 10:
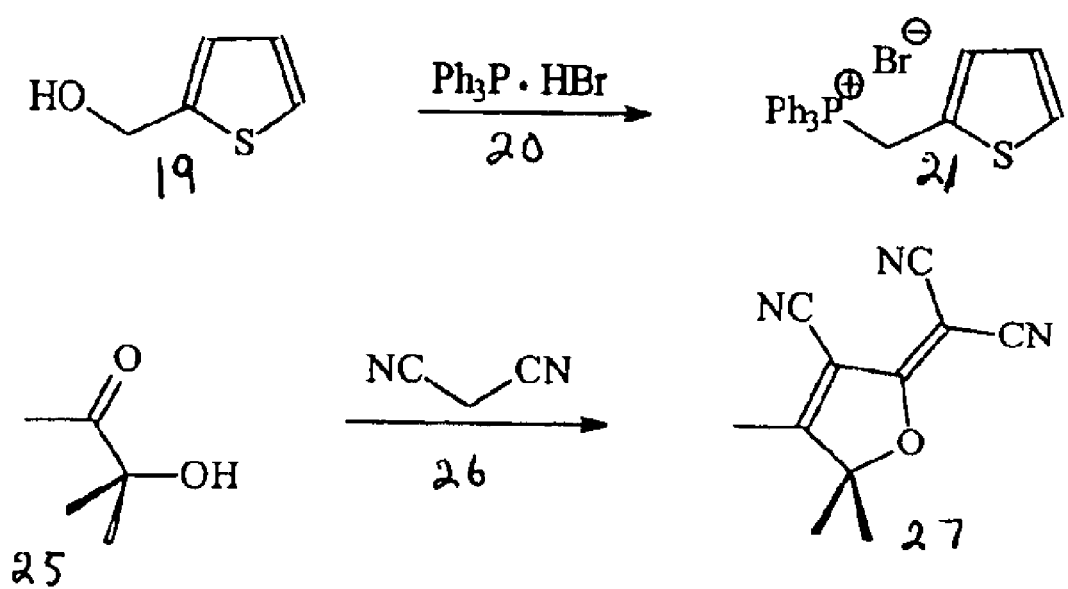
FIG. 10 depicts an exemplary synthetic route to an exemplary electron acceptor of a chromophore.
Figure 11:
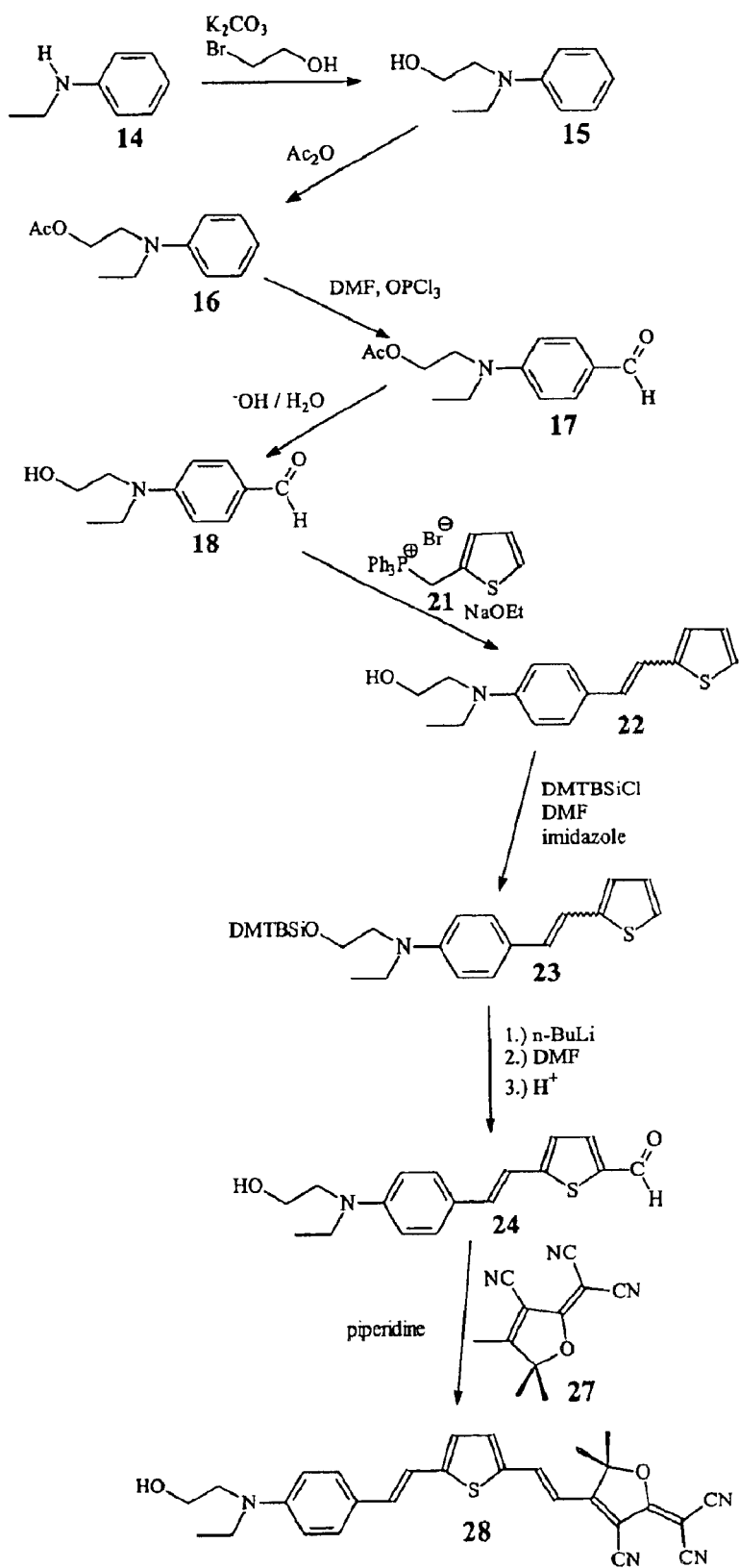
FIG. 11 depicts an exemplary synthetic route to an exemplary chromophore.

PPOL 1 functionalized with chrom. 8 (n=2, FIG. 9): $r_{33}$=17 pm/V, Tg=148° C.

PPOL 1 functionalized with chrom. 8 (n=6, FIG. 9): $r_{33}$= 35–40 pm/V

All polymers were spincoated from 1,2,3-trichloropropane solution onto ITO-coated glass substrates. Poling was done using a traditional corona set-up and nonlinear optical characterization was done by second-harmonic generation at a wavelength of 1064 nm. From these measurements, electro-optic coefficients at 1500 nm were estimated using the formalism described in "D. M. Burland et al, Chem. Rev., 1994, 94, 31".

Example 20

Figure 12:
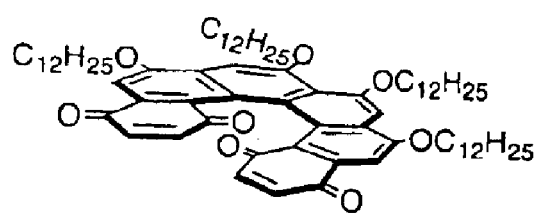
FIG. 12 depicts exemplary chiral helical structures.
Figure 12:
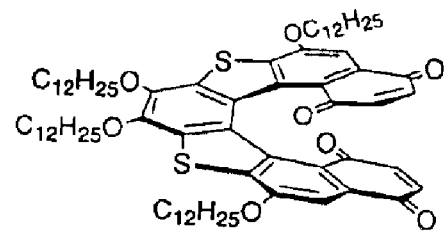
Figure 13:
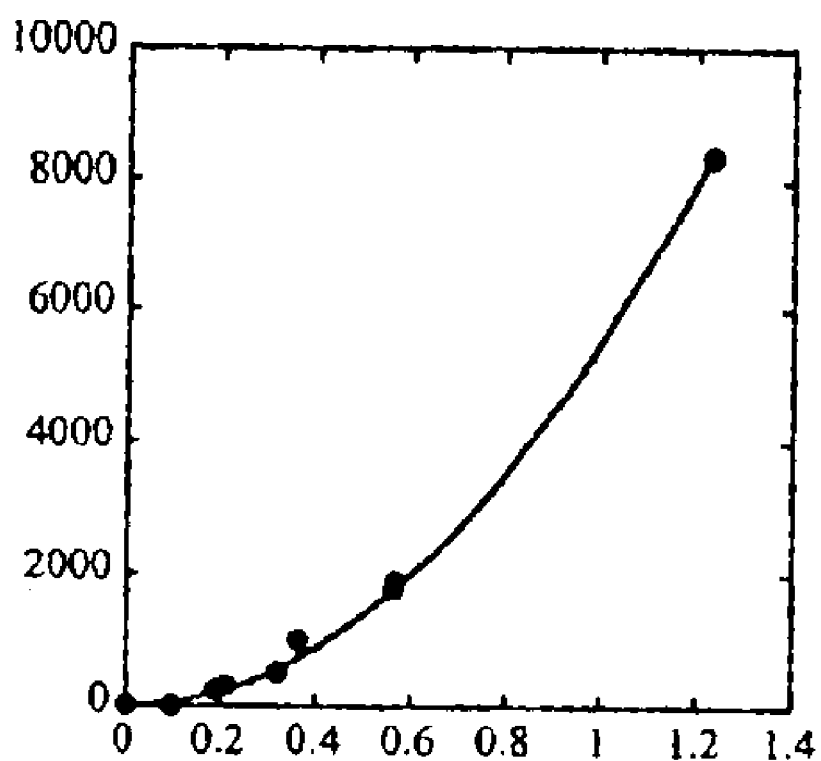
FIG. 13 depicts the second harmonic signal intensity vs. thickness ($\mu$m) for films of the chiral helical polymer 41 depicted in FIG. 12.

Chiral helicene bisquinone nonracemic derivatives 41 and 51 (FIG. 12) were spincoated from concentrated chloroform solutions onto hydrophobic glass slides, yielding films with thicknesses from 0.1 to 0.6 microns. The resulting film had a $D_{2S}$ symmetry with nonlinearities on the order of −29 pm/V. The nonracemic form of these materials self-aggregates into corkscrew-shaped assemblies, both in concentrated alkane solutions and in the pure material. In thin films the corkscrew-shaped assemblies further organize into thin lamellae. In thicker films (several tens of microns) obtained by cooling nonracemic 41 and 51 from an isotropic melt, the corkscrew-shaped assemblies organize into macroscopic fibers that are clearly visible under an optical microscope.

Slightly thicker films (up to 1.2 microns) were prepared by heating small amounts of solid 41 and 51 between two glass slides above the melting point, followed by cooling to room temperature. The resulting films are of remarkable optical quality. No macroscopic fibers are visible.

Example 21
Measurement of Second Harmonic Generation

Figure 3:
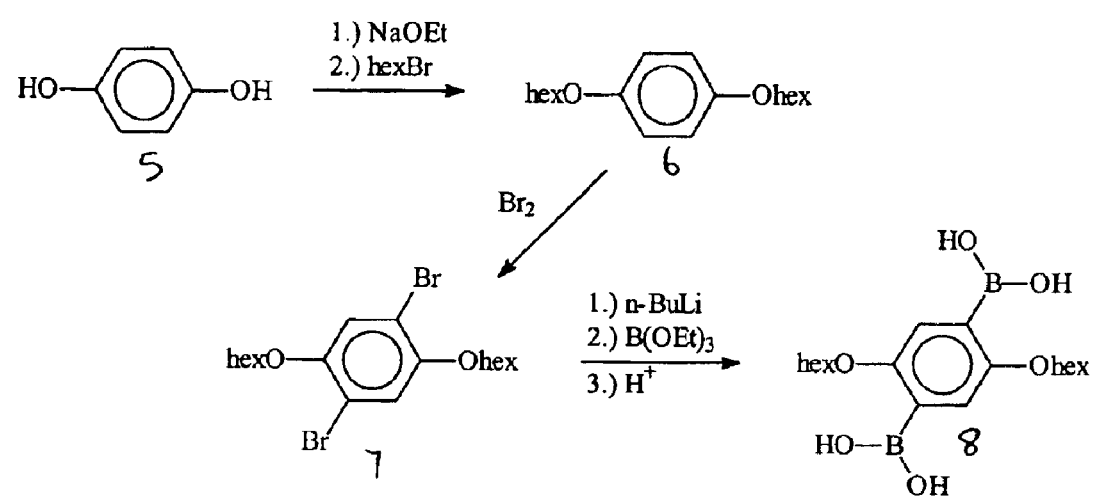
FIG. 3 depicts an exemplary synthetic route to an exemplary monomer 8.
Figure 4:
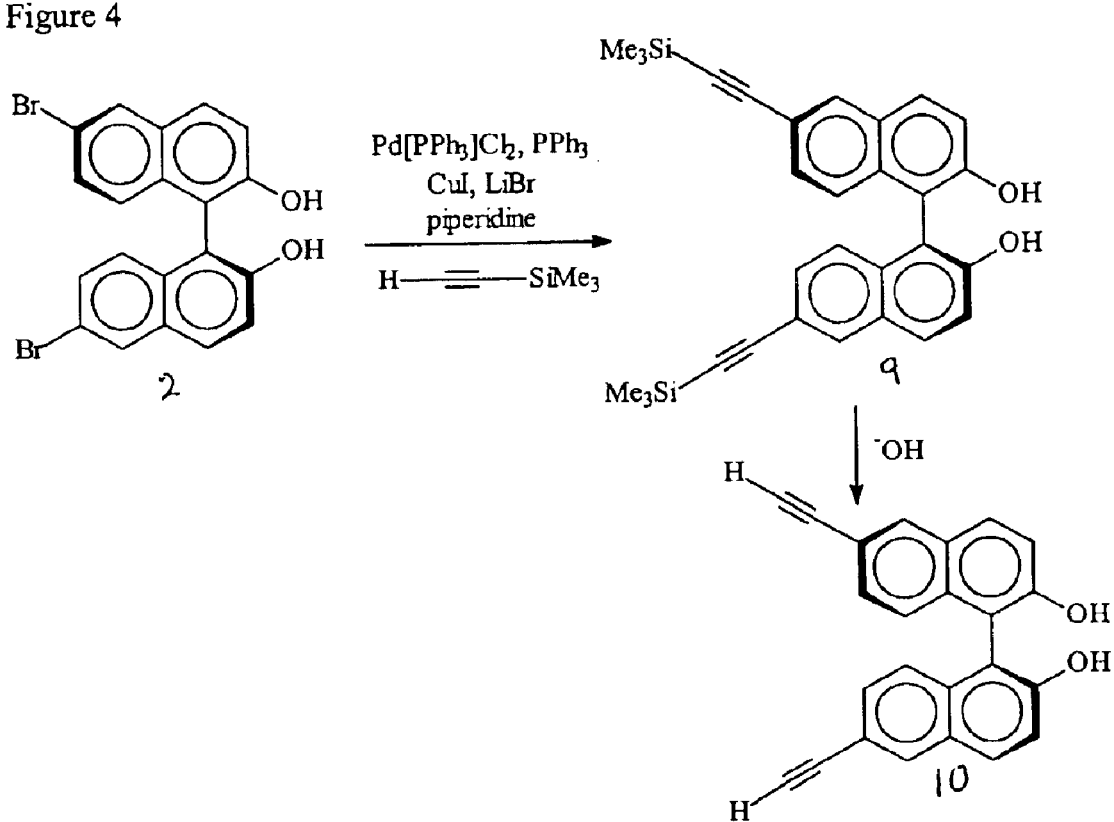
FIG. 4 depicts an exemplary synthetic route to an exemplary monomer 10.
Figure 5:
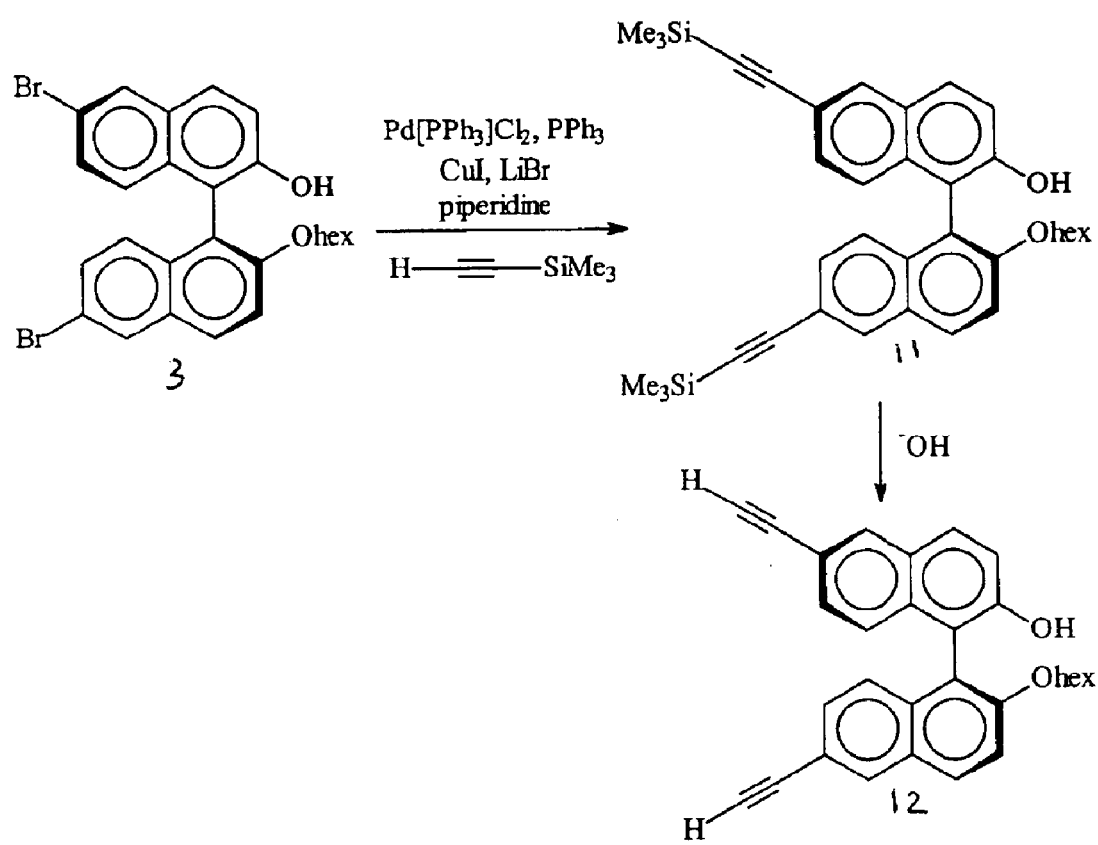
FIG. 5 depicts an exemplary synthetic route to an exemplary monomer 12.
Figure 6:
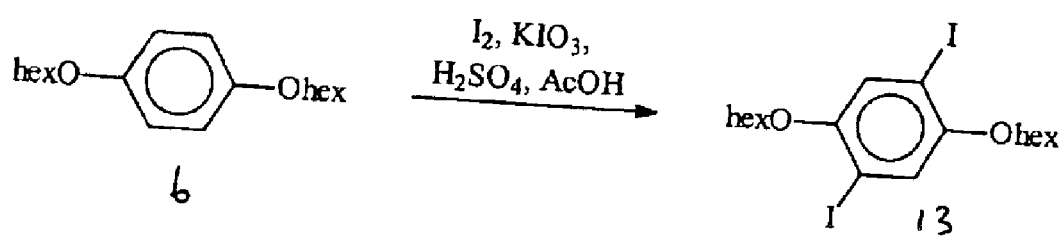
FIG. 6 depicts an exemplary synthetic route to an exemplary monomer 13.
Figure 7:
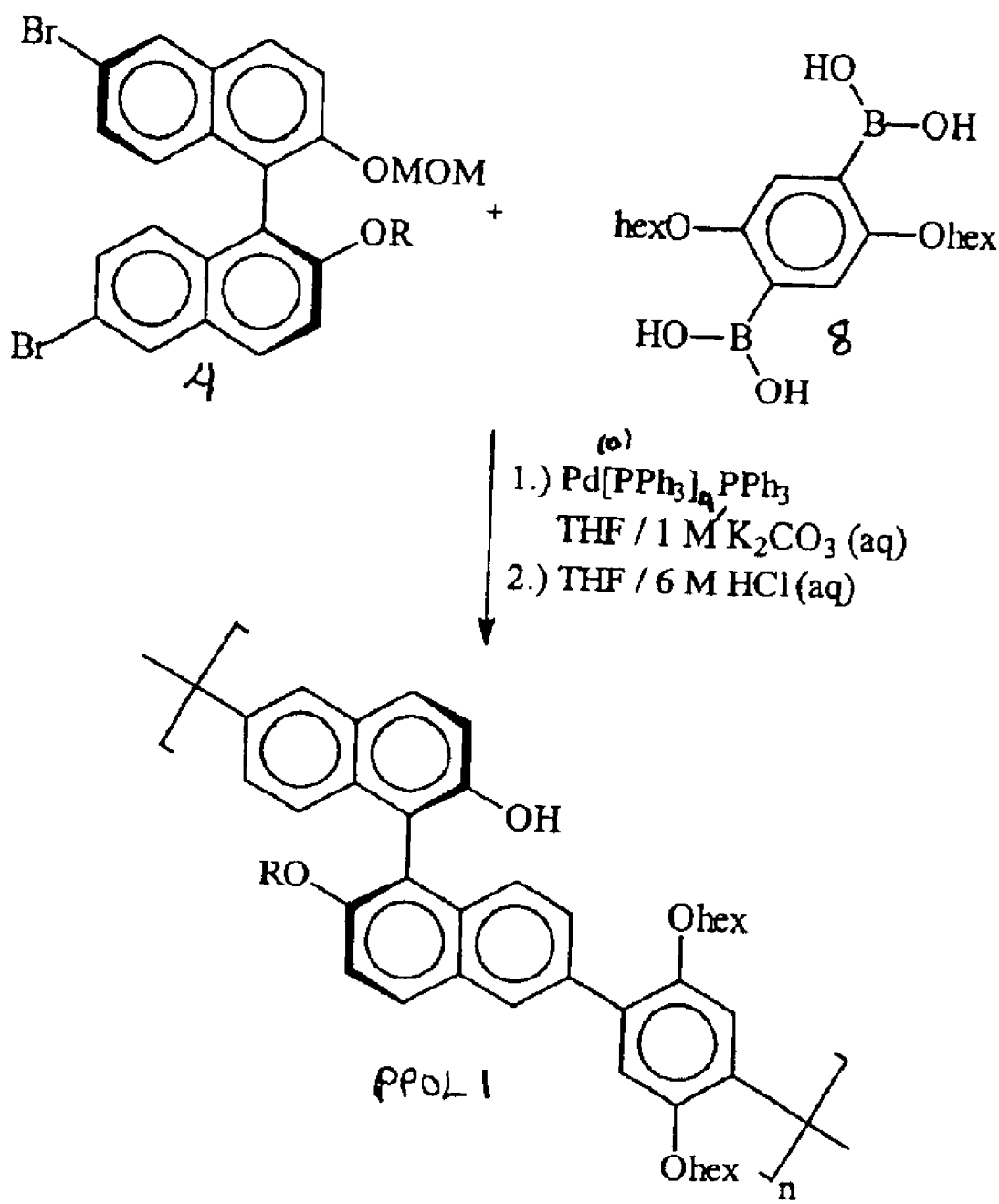
FIG. 7 depicts an exemplary synthetic route to an exemplary polymer PPOL 1.
Figure 8:
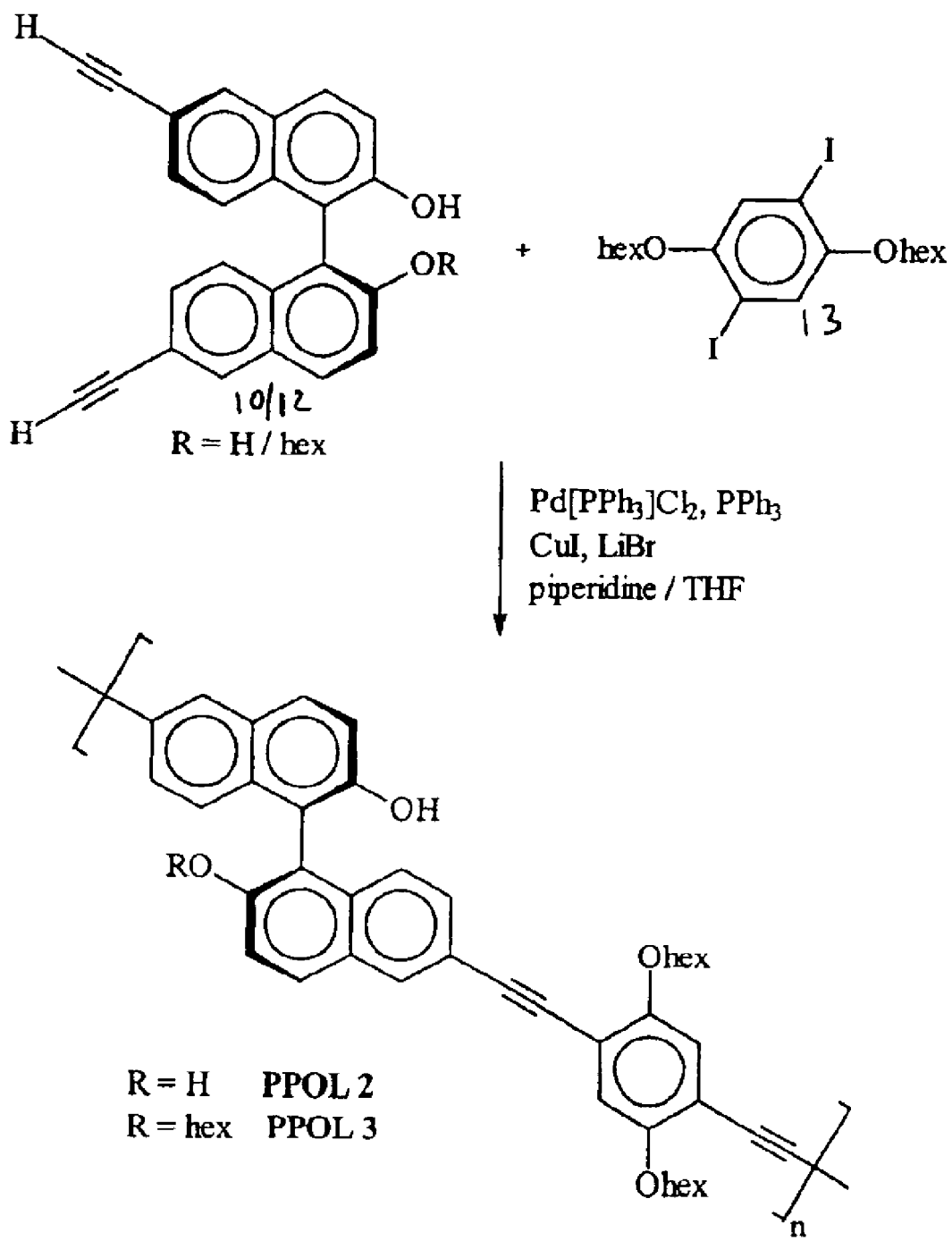
FIG. 8 depicts an exemplary synthetic route to exemplary polymers PPOL 2 and PPOL 3.

The second-harmonic generation experiments were done by irradiating the samples at a 45° angle of incidence with a fundamental beam from a Nd:YAG laser (1064 nm, 50 Hz, 8 ns) and detecting the second-harmonic light in the transmitted direction. Half- and quarter waveplates were used to control the polarization of the irradiating beam, and the second-harmonic light could be resolved into p- and s-polarized components. The nonracemic films of 41 and 51 showed a fairly strong second-harmonic response, indicating that the films are noncentrosymmetric and have at least a $D_{2S}$ symmetry. Furthermore, the second-harmonic signal increases quadratically with thickness for both films. FIG. 3 shows the second-harmonic signal (for a p-polarized fundamental beam) for films of compound 41 which grows quadratically for thicknesses ranging from 0.1 to 1.2 microns.

Example 22
Physical Properties of a Chiral Substance

Heating films of 41 and 51 up to temperatures over 200° C. has no significant effect on their SH-efficiency. Above the melting point (211° C. for 41 and 235° C. for 51), the material becomes an isotropic liquid with no SHG properties and the signal drops to zero. However, after the samples are cooled to below the melting points the SH signal spontaneously return to their original values, indicating that the samples are thermodynamically stable.

REFERENCES

All publications and patents mentioned herein, are hereby incorporated by reference in their entirety as if each individual publication or patent was specifically and individually indicated to be incorporated by reference. In case of conflict, the present application, including any definitions herein, will control.

U.S. Pat. Nos. 6,194,120; 5,290,630; 5,549,853; 6,229,047; M. Kauranen, et al. (1995) *Science* 470:966; T. Verbiest et al. (1995) *Science* 268:1604

EQUIVALENTS

Those skilled in the art will recognize, or be able to ascertain using no more than routine experimentation, many equivalents to the specific embodiments of the invention described herein. Such equivalents are intended to be encompassed by the following claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

We claim:

1. An optically active compound comprising:
   a) a polymer comprising a monomeric unit comprising a binaphthyl moiety; and
   b) a chromophore chemically bonded to said monomeric unit;
   wherein said optically active compound has non-centrosymmetric symmetry.

2. The optically active compound of claim 1, wherein said binaphthyl moiety is selected from the group consisting of binaphthyl, binaphthol, 1,1'-binaphthyl-2-ol-2'-amine, and 1,1'-binaphthyl-2,2'-diamine.

3. The optically active compound of claim 1, wherein said binaphthyl moiety further comprises an alkyl moiety.

4. The optically active compound of claim 1, wherein said binaphthyl moiety comprises an alkynyl group.

5. The optically active compound of claim 1, wherein said monomeric unit is selected from the structures represented by formulas I and II:

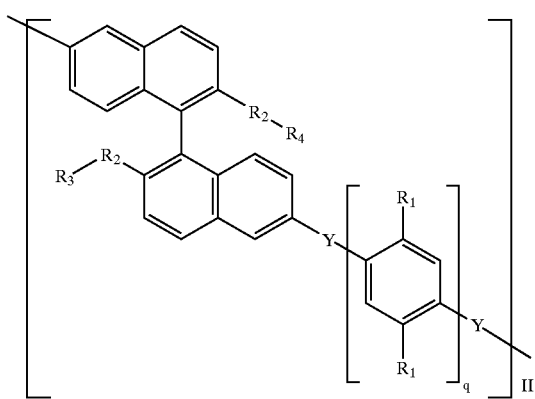

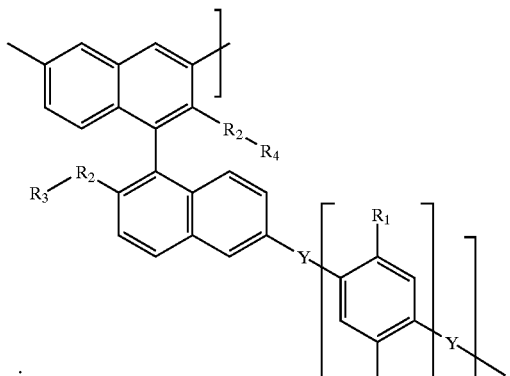

wherein
Y represents independently for each occurrence a bond, alkyl, alkenyl, or alkynyl;
$R_1$ represents independently for each occurrence H, alkyl, or alkoxy;
$R_2$ represents independently for each occurrence $N(R_1)$, O, S, Se or alkylene;
$R_3$ represents independently for each occurrence H, alkyl, or said chromophore;
$R_4$ represents independently for each occurrence H, alkyl or said chromophore; and
q is in the range 1 to 7 inclusive.

6. The optically active compound of claim 5, wherein $R_1$ is —O-alkyl.

7. The optically active compound of claim 6, wherein $R_1$ is —O-hexyl.

8. The optically active compound of claim 1, wherein $R_3$ is alkyl.

9. The optically active compound of claim 6, wherein $R_3$ is —O-hexyl.

10. The optically active compound of claim 8, wherein $R_2$ is O.

11. The optically active compound of claim 1, wherein $R_4$ an alkyl-chromophore moiety.

12. The optically active compound of claim 1, wherein said monomeric unit is represented by the structure:

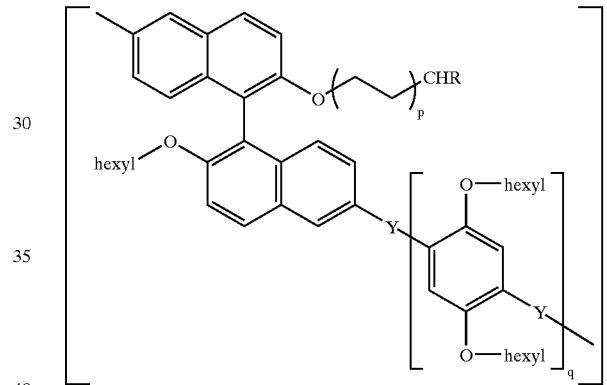

wherein
Y represents independently for each occurrence alkyl or alkynyl;
CHR represents said chromophore;
p is in the range 0 to 7 inclusive; and
q is in the range 1 to 7 inclusive.

13. The optically active compound of claim 1, wherein said polymer comprises at least about five monomeric units.

14. The optically active compound of claim 12, wherein said polymer comprises at least about two monomeric units.

15. The optically active compound of claim 12, wherein q is in the range of 1 to 3.

16. The optically active compound of claim 12, wherein q is 1.

17. The optically active compound of claim 12, wherein greater than about 5% of said monomeric units are functionalized with a chromophore.

18. The optically active compound of claim 1, wherein said monomeric unit comprises two chromophores.

19. The optically active compound of claim 1, wherein said compound exhibits an electro-optic coefficient of greater than about 10 pm/V.

20. A nonlinear optical polymer selected from group consisting of formulas I and II:

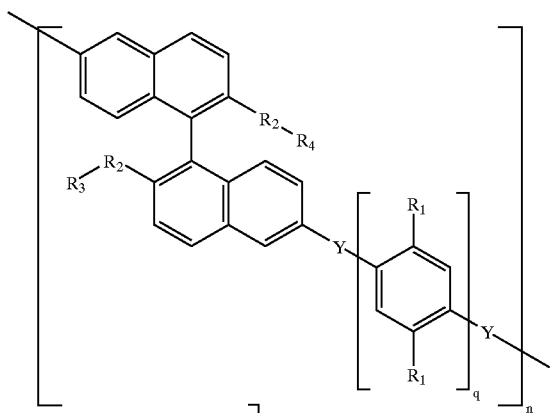

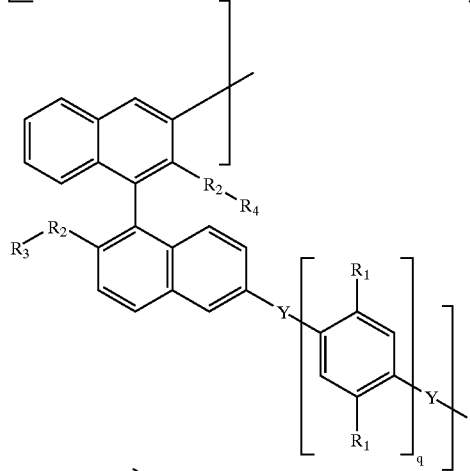

wherein
- Y represents independently for each occurrence a bond, alkyl, alkenyl, or alkynyl;
- $R_1$ represents independently for each occurrence H, alkyl, or alkoxy;
- $R_2$ represents independently for each occurrence $N(R_1)$, O, S, Se or alkylene;
- $R_3$ represents independently for each occurrence H, alkyl, or a chromophore;
- $R_4$ represents independently for each occurrence H, alkyl or a chromophore;
- n is an integer from 1 to about 100; and
- q is in the range 1 to 7 inclusive.

21. The nonlinear optical polymer of claim 20, wherein n is about 5 to about 20.

22. The nonlinear optical polymer of claim 20, wherein $R_4$ is a chromophore for at least one monomeric unit of said polymer.

23. The nonlinear optical polymer of claim 21, wherein $R_1$ is —O-alkyl.

24. The nonlinear optical polymer of claim 23, wherein $R_1$ is —O-hexyl.

25. The nonlinear optical polymer of claim 20, wherein $R_3$ is alkyl.

26. The nonlinear optical polymer of claim 25, wherein $R_3$ is —O-hexyl.

27. The nonlinear optical polymer of claim 24, wherein $R_2$ is O.

28. The nonlinear optical polymer of claim 25, wherein $R_4$ is an alkyl-chromophore moiety.

29. The nonlinear optical polymer of claim 25, wherein the percentage of monomeric units of said polymer functionalized with one or more chromophores is greater than about 5%.

30. The nonlinear optical polymer of claim 25, wherein $R_2$ is O, and Y is an alkyl.

31. The nonlinear optical polymer of claim 25, wherein $R_2$ is O, and Y is an alkynyl.

32. The nonlinear optical polymer of claim 20, wherein said polymer is represented by the structure:

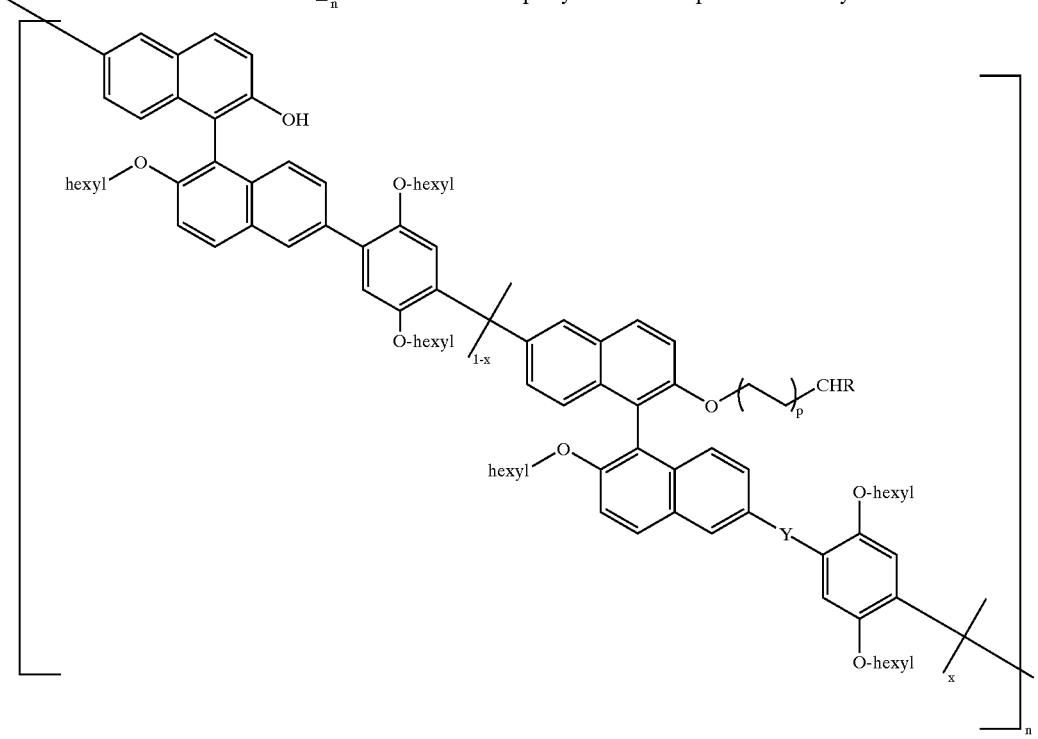

wherein

CHR represents for each occurrence a chromophore;

p is an integer in the range 0 to 7 inclusive;

x is 1 to about 50; and n is about 10 to about 50.

33. The nonlinear optical polymer of claim 20, wherein said polymer exhibits an electro-optic coefficient of greater than about 10 pm/V.

34. The nonlinear optical polymer of claim 20, wherein the weight percent of chromophore is greater than about 10%.

35. A polymer composition comprising:

a) a polymer comprising at least one monomeric unit represented by formula I or II:

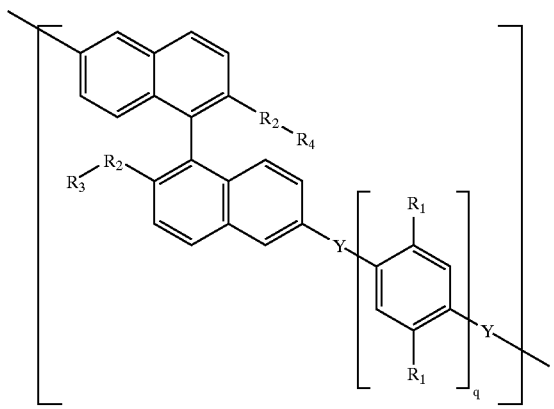

I

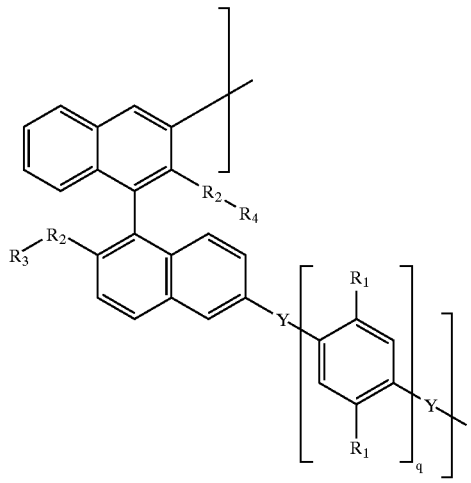

II wherein

Y represents independently for each occurrence a bond, alkyl, alkenyl, or alkynyl;

$R_1$ represents independently for each occurrence H, alkyl, or alkoxy;

$R_2$ represents independently for each occurrence $N(R_1)$, O, S, Se or alkylene;

$R_3$ represents independently for each occurrence H, alkyl, or a chromophore;

$R_4$ represents independently for each occurrence H, alkyl or a chromophore;

q is in the range 1 to 7 inclusive; and b) a chromophore.

36. The polymer composition of claim 35, wherein said chromophore is pendantly bound to at least one said monomeric unit.

* * * * *